(12) United States Patent
Erb et al.

(10) Patent No.: US 12,269,212 B2
(45) Date of Patent: Apr. 8, 2025

(54) CERAMIC-REINFORCED POLYMER COMPOSITES WITH HERRINGBONE ARCHITECTURE

(71) Applicant: Northeastern University, Boston, MA (US)

(72) Inventors: Randall Erb, Newton, MA (US); Robert Zando, Boston, MA (US); Alain Karma, Belmont, MA (US); Ataollah Mesgarnejad, Covington, LA (US)

(73) Assignee: Northeastern University, Boston, MA (US)

( * ) Notice: Subject to any disclaimer, the term of this patent is extended or adjusted under 35 U.S.C. 154(b) by 1038 days.

(21) Appl. No.: 17/194,399

(22) Filed: Mar. 8, 2021

(65) Prior Publication Data

US 2021/0276253 A1    Sep. 9, 2021

Related U.S. Application Data

(60) Provisional application No. 63/124,187, filed on Dec. 11, 2020, provisional application No. 62/985,966, filed on Mar. 6, 2020.

(51) Int. Cl.
| | |
|---|---|
| *B29C 64/165* | (2017.01) |
| *B29C 64/188* | (2017.01) |
| *B29C 64/264* | (2017.01) |
| *B29C 64/307* | (2017.01) |
| *B29C 70/04* | (2006.01) |
| *B29K 33/00* | (2006.01) |
| *B29K 305/02* | (2006.01) |
| *B33Y 10/00* | (2015.01) |
| *B33Y 70/10* | (2020.01) |
| *B33Y 80/00* | (2015.01) |

(52) U.S. Cl.
CPC .......... *B29C 64/165* (2017.08); *B29C 64/188* (2017.08); *B29C 64/264* (2017.08); *B29C 64/307* (2017.08); *B29C 70/04* (2013.01); *B33Y 10/00* (2014.12); *B33Y 70/10* (2020.01); *B33Y 80/00* (2014.12); *B29K 2033/08* (2013.01); *B29K 2305/02* (2013.01); *B29K 2995/0008* (2013.01); *B29K 2995/0044* (2013.01); *B29K 2995/005* (2013.01); *B29K 2995/0094* (2013.01)

(58) Field of Classification Search
CPC ... B29C 64/165; B29C 70/04; B29K 2033/08; B29K 2305/02; B29K 2995/0008; B29K 2995/0044; B29K 2995/005; B29K 2995/0094; B33Y 10/00; B33Y 40/10; B33Y 80/00; B33Y 70/10; C04B 2235/3217; C04B 35/62826
See application file for complete search history.

(56) References Cited

U.S. PATENT DOCUMENTS

| | | | |
|---|---|---|---|
| 10,703,052 B2 | 7/2020 | Erb et al. | |
| 2017/0136699 A1* | 5/2017 | Erb | ............... B22F 10/12 |

OTHER PUBLICATIONS

Feilden et al., "3D Printing Bioinspired Ceramic Composites" Scientific Reports 2017, 7 (1), 13759, 9 pages.
Natarajan et al., "., Bioinspired Bouligand cellulose nanocrystal composites: a review of mechanical properties" Philosophical Transactions of the Royal Society A: Mathematical, Physical and Engineering Sciences 2018, 376 (2112), 20170050, pp. 1-16.
Yang et al., "Biomimetic Anisotropic Reinforcement Architectures by Electrically Assisted Nanocomposite 3D Printing" Advanced Materials 2017, 29 (11), 1605750, pp. 1-8.
Le Ferrand et al., "Magnetically assisted slip casting of bioinspired heterogeneous composites" Nature Materials 2015, 14 (11), 1172-1179; 12 pages.
Shih et al., "Energy release rate along a three-dimensional crack front in a thermally stressed body" International Journal of Fracture, 30(2), 1986, pp. 79-102.
Martin et al., "Designing bioinspired composite reinforcement architectures via 3D magnetic printing" Nature Communications 2015, 6 (1), 8641, pp. 1-7.
Mesgarnejad et al., "Crack path selection in orientationally ordered composites" arXiv:1811.05891; Physical Review E 102, 103004 (2020); pp. 1-17.

* cited by examiner

*Primary Examiner* — Ana L. Woodward
(74) *Attorney, Agent, or Firm* — Verrill Dana, LLP

(57) ABSTRACT

A composite material of particles disposed in a matrix material is provided in which the particles have an asymmetric geometric shape with a longest dimension and a shortest dimension different from the longest dimension. Adjacent volume portions of the composite material are arranged in a mosaic pattern to abut along an interface or surface forming a common boundary between the adjacent volume portions. The particles within the adjacent volume portions are arranged with differing orientations with respect to the interface. The orientations of the particles in the adjacent volume portions are selected so that a crack propagating on a crack propagation path through one or the other of the adjacent volume portions stops at or deflects to propagate along the interface. Methods of making composite materials are also provided.

14 Claims, 21 Drawing Sheets

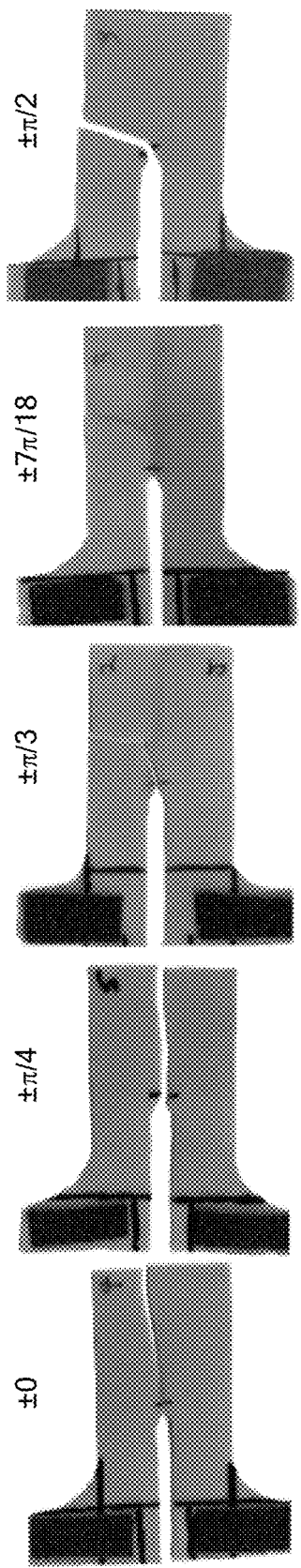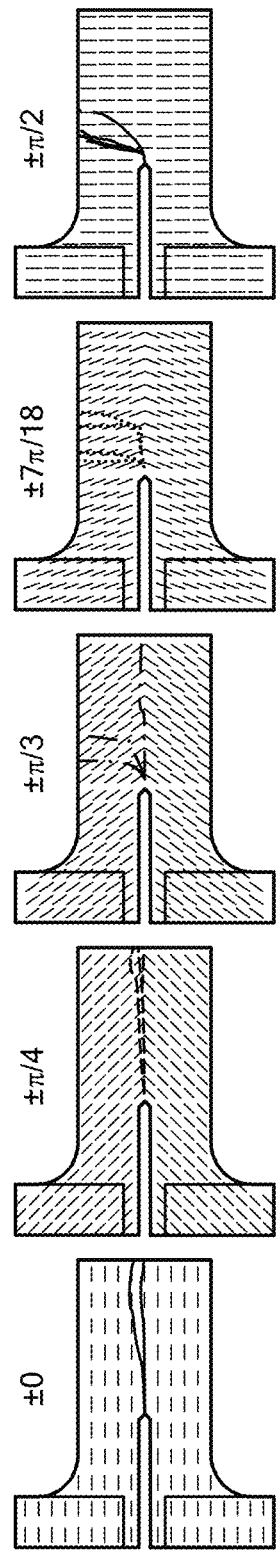
FIG. 7A
FIG. 7B

CERAMIC-REINFORCED POLYMER COMPOSITES WITH HERRINGBONE ARCHITECTURE

CROSS REFERENCE TO RELATED APPLICATIONS

This application claims priority under 35 U.S.C. § 119(e) of U.S. Provisional Application No. 62/985,966, filed on 6 Mar. 2020, entitled "Ceramic-Reinforced Polymer Composites with Herringbone Architecture," and U.S. Provisional Application No. 63/124,187, filed on 11 Dec. 2020, entitled "Ceramic-Reinforced Polymer Composites with Herringbone Architecture," the disclosures of which are hereby incorporated by reference.

STATEMENT REGARDING FEDERALLY SPONSORED RESEARCH OR DEVELOPMENT

This invention was made with government support under Grant Number 1536354 awarded by the National Science Foundation. The government has certain rights in the invention.

BACKGROUND

Inhomogeneities can be beneficial to mechanical properties, such as toughness, if distributed through a material effectively. Such inhomogeneities come in an array of formats, from grain boundaries and ceramic precipitations in engineered metal alloys to ceramic particulates in mammalian bone and crustaceans. In these cases, the organization of inhomogeneities is described by an optimized microscale architecture that is integral to macroscale toughness. Toughness represents the ability of materials systems to inhibit the initiation and propagation of cracks from defects and is often the determining factor of overall material performance, especially for more brittle systems under cyclic loading such as bone and structural composites. Specifically, toughness is the energy that a material can absorb prior to and during fracture and includes the initiation toughness, which inhibits the starting of a crack from a void or defect, the propagation toughness, which inhibits the growth of a nanoscopic crack, and the total toughness, which inhibits the complete failure or breaking of a sample or part. In all cases, the toughness is derived from both configurational system properties such as the loading and the sample or part geometry and inherent materials properties such as the fracture toughness.

SUMMARY

Crack deflection is often used as evidence of substantive fracture toughness in both natural and synthetic composites. The associated microstructures of these tough composites are often highly anisotropic, exhibiting both easy and hard directions for crack propagation. Cracks generally deflect away from hard directions to propagate instead in easy directions. Allowing a crack to deflect toward easy directions ties the composite's overall fracture toughness to its weak axis. Instead, enhanced fracture toughness can be realized when cracks are forced to propagate along the hard directions. Composite manufacturing using 3D magnetic printing techniques can enable the creation of detailed microstructures that can locally tune the fracture toughness anisotropy. The technology described herein includes a family of architectures reminiscent of a herringbone pattern, in which propagating cracks are effectively trapped along the spine between two regions. Along this spine, a crack can be inhibited from deflecting and forced to propagate along a relatively hard direction, resulting in a significant boost in initial and overall fracture toughness. Toughened herringbone patterns can be expanded to herringbone mosaics and an approach is described for patterning composites to provide isotropic and enhanced fracture toughness. Both numerical and experimental modalities to systematically test and characterize this new class of composite architectures are described.

Other aspects, features, and embodiments include the following:

1. A composite material comprising:
   a volume of a matrix material and a plurality of particles disposed within the matrix material, the particles having a geometric shape with a longest dimension and a shortest dimension different from the longest dimension; and
   the volume has an anisotropic structure in at least two dimensions comprising:
      a plurality of volume portions arranged in a mosaic pattern with adjacent volume portions abutting along an interface comprising a surface forming a common boundary between the adjacent volume portions, and
      the particles within adjacent volume portions are disposed in orientations in which the geometric shape with the longest dimension is disposed at a non-orthogonal angle with respect to the interface, the orientation of the particles in one of the pair of the adjacent volume portions differing from the orientation of the particles in the other of the pair of the adjacent volume portions, the orientations of the particles in the pair of the adjacent volume portions selected so that a crack propagating on a crack propagation path through the one or the other of the pair of the adjacent volume portions stops at or deflects to propagate along the interface.

2. The composite material of 1, wherein at least a subset of the plurality of the volume portions are arranged in the mosaic pattern to be adjacent to at least three other volume portions.

3. The composite material of any of 1-2, wherein the non-orthogonal angles between the particles within the adjacent volume portions and the interface between the adjacent volume portions are a function of a fracture energy anisotropy of the composite material.

4. The composite material of any of 1-3, wherein the non-orthogonal angle of each of the volume portions is selected such that a fracture energy anisotropy of the composite material is equal to or greater than 3.

5. The composite material of any of 1-4, wherein the anisotropic structure provides a reduction of a driving force of a crack tip regardless of crack initiation location or direction as the crack tip propagates through the volume.

6. The composite material of any of 1-5, wherein the anisotropic structure provides a mechanical property tuned along a selected direction.

7. The composite material of any of 1-6, wherein the anisotropic structure provides compressive loading reinforcement, tensile loading reinforcement, or both compressive loading and tensile loading reinforcement.

8. The composite material of any of 1-7, wherein the anisotropic structure provides increased fracture toughness along the interface.

9. The composite material of any of 1-8, wherein the orientation of the particles in at least some of the adjacent volume portions are mirror symmetric with respect to the interface.

10. The composite material of an-9y of 1, wherein the orientation of the particles in the adjacent volume portions form a herringbone pattern in a plane normal to the interface, the interface forming a spine of the herringbone pattern.

11. The composite material of any of 1-10, wherein the non-orthogonal angle ranges from 20°±1° to 80°±1° with respect to the interface, the non-orthogonal angle ranges from 30°±1° to 75°±1° with respect to the interface, or the non-orthogonal angle ranges from 45°±1° to 70°±1° with respect to the interface.

12. The composite material of any of 1-11, wherein the volume comprises a layer having opposed surfaces and a thickness between the opposed surfaces, and the volume portions are arranged in a polygonal pattern within the layer.

13. The composite material of any of 1-12, wherein the polygonal pattern is a hexagonal pattern.

14. The composite material of any of 1-13, wherein the orientation of the particles in the adjacent volume portions of the hexagonal pattern differ by 30°±1° or the orientation of the particles in the adjacent volume portions of the hexagonal pattern differ by 60°±1°.

15. The composite material of any of 1-14, wherein the volume portions each have an area in a plane normal to the interface that at least ten times greater than the shortest dimension of the particles within the volume portions.

16. The composite material of any of 1-15, wherein the volume further comprises a plurality of layers, each layer having opposed surfaces and a thickness between the opposed surfaces, the layers arranged in a stack in a thickness direction, and the volume portions are arranged in a polygonal pattern within each layer.

17. The composite material of any of 1-16, wherein the polygonal pattern within each layer is a hexagonal pattern, and the hexagonal pattern within each layer is rotated in a plane parallel to the opposed surfaces with respect to the hexagonal pattern in an adjacent layer.

18. The composite material of any of 1-17, wherein the polygonal pattern within each layer is rotated with respect to the polygonal pattern in an adjacent layer to provide a Bouligand structure.

19. The composite material of any of 1-18, wherein each of the volume portions is a Wigner-Seitz unit cell.

20. The composite material of any of 1-19, wherein the anisotropic structure comprises a rotating herringbone structure, rows of stacked herringbone structures, or a Bouligand structure.

21. The composite material of any of 1-20, wherein the anisotropic structure of the volume is anisotropic in two dimensions or in three dimensions.

22. The composite material of any of 1-21, wherein the geometric shape of the particles is a platelet, flake, filing, fiber, rod, or whisker.

23. The composite material of any of 1-22, wherein the particles have a longest dimension ranging from 200 nm to 1000 µm.

24. The composite material of any of 1-23, wherein the particles have a longest dimension ranging from 1 µm to 20 µm.

25. The composite material of any of 1-24, wherein the particles have an aspect ratio of the longest dimension to the shortest dimension of at least 2.

26. The composite material of any of 1-25, wherein the particles have an aspect ratio of the longest dimension to the shortest dimension ranging from 2 to 200.

27. The composite product of any of 1-26, wherein the particles are magnetically responsive particles comprising at least in part a magnetic material.

28. The composite product of any of 1-27, wherein the magnetic material comprises a ferromagnetic material, a paramagnetic material, a superparamagnetic material, iron oxide, iron, cobalt, nickel, an iron alloy, a cobalt alloy, or a nickel alloy.

29. The composite material of any of 1-28, wherein the magnetic material comprises particles, microbeads, nanoparticles, filings, fibers, flakes, rods, whiskers, or platelets.

30. The composite material of any of any of 1-29, wherein the magnetically responsive particles comprise a non-magnetic material coupled with the magnetic material.

31. The composite material of any of 1-30, wherein the non-magnetic material comprises aluminum oxide, calcium phosphate, copper, glass, calcium sulfate, nylon, polystyrene, or silicon carbide.

32. The composite material of any of 1-31, wherein the non-magnetic material comprises discontinuous fibers, rods, platelets, flakes, or whiskers.

33. The composite material of any of 1-32, wherein the non-magnetic material is coated with the magnetic material.

34. The composite material of any of 1-33, wherein the matrix material is a polymer and the particles comprise aluminum oxide platelets coated with a magnetically responsive material.

35. The composite material of any of 1-34, wherein the matrix material is a thermoset polymer, polyurethane, silicone, acrylic, acrylonitrile butadiene styrene, nylon, poly lactic acid, polycarbonate, polyethylene, polypropylene, polystyrene, polyvinyl chloride, polytetrafluoroethylene, polymethylmethacrylate, collagen, gelatin, or alginate.

36. A product comprising the composite material of any of 1-35.

37. A composite material comprising:
    a volume of a polymer matrix material and a plurality of reinforcing particles disposed within the matrix material, the particles having a platelet shape with a longest dimension and a shortest dimension different from the longest dimension, wherein the longest dimension is at least 200 nm and the particles have an aspect ratio of the longest dimension to the shortest dimension of at least 2; and
    the volume has an anisotropic structure providing increased fracture toughness along a selected direction and an anisotropic fracture energy of at least 3, the anisotropic structure comprising:
        a plurality of volume portions arranged in a mosaic pattern with adjacent volume portions abutting along an interface comprising a surface forming a common boundary between the adjacent volume portions, and
        the particles within the adjacent volume portions are disposed in orientations in which the platelet shape with the longest dimension is disposed at a non-orthogonal angle with respect to the interface, the orientation of the particles in one of the pair of the adjacent volume portions differing from the orientation of the particles in the other of the pair of the adjacent volume portions, the non-orthogonal angles between the particles within the adjacent volume portions and the interface between the adjacent volume portions are a function of fracture energy anisotropy, the orientations of the particles in the pair of the adjacent volume portions selected so that a crack propagating on a crack propagation path through the one or the other of the pair of the adjacent volume portions stops at or deflects to propagate along the interface.

38. The composite material of 37, wherein the matrix material is a polymer and the reinforcing particles comprise aluminum oxide platelets coated with a magnetically responsive material.

39. A method of making a composite material product, comprising:
   (a) determining a pattern of an anisotropic structure of a composite material comprising a volume of a matrix material and a plurality of particles disposed within the matrix material, the particles having a geometric shape with a longest dimension and a shortest dimension different from the longest dimension, the anisotropic structure comprising:
      a plurality of volume portions arranged in a mosaic pattern with adjacent volume portions abutting along an interface comprising a surface forming a common boundary between the adjacent volume portions, and
      the particles within the adjacent volume portions are disposed in orientations in which the geometric shape with the longest dimension is disposed at a non-orthogonal angle with respect to the interface, the orientation of the particles in one of the pair of the adjacent volume portions differing from the orientation of the particles in the other of the pair of the adjacent volume portions, the orientations of the particles in the pair of the adjacent volume portions selected so that a crack propagating on a crack propagation path through the one or the other of the pair of the adjacent volume portions stops at or deflects to propagate along the interface.
   (b) providing a precursor matrix material and the plurality of particles disposed within the precursor matrix material; and
   (c) consolidating the precursor matrix material to form the composite material with the plurality of particles disposed within the matrix material according to the pattern.

40. The method of 39, further comprising determining the non-orthogonal angles between the particles within the adjacent volume portions and the interface between the adjacent volume portions as a function of fracture energy anisotropy of the composite material.

41. The method of any of 39-40, wherein the non-orthogonal angles are determined to provide a fracture energy anisotropy of at least 3.

42. The method of any of 39-41, wherein at least a subset of the plurality of the volume portions are arranged in the mosaic pattern to be adjacent to at least three other volume portions.

43. The method of any of 39-42, wherein the orientation of the particles in at least some of the adjacent volume portions are mirror symmetric with respect to the interface.

44. The method of any of 39-43, wherein the orientation of the particles in the adjacent volume portions are arranged to form a herringbone pattern in a plane normal to the interface, the interface forming a spine of the herringbone pattern.

45. The method of any of 39-44, wherein the non-orthogonal angle is selected to range from 20°±1° to 80°±1° with respect to the interface, the non-orthogonal angle is selected to range from 30°±1° to 75°±1° with respect to the interface, or the non-orthogonal angle is selected to range from 45°±1° to 70°±1° with respect to the interface.

46. The method of any of 39-45, wherein the volume comprises a layer having opposed surfaces and a thickness between the opposed surfaces, and the volume portions are arranged in a polygonal pattern within the layer.

47. The method of any of 39-46, wherein the polygonal pattern is a hexagonal pattern.

48. The method of any of 39-47, wherein the orientation of the particles in the adjacent volume portions of the hexagonal pattern is selected to differ by 30°±1° or by 60°±1°.

49. The method of any of 39-48, wherein the volume portions each have an area in a plane normal to the interface that at least ten times greater than the shortest dimension of the particles within the volume portions.

50. The method of any of 39-49, wherein the volume further comprises a plurality of layers, each layer having opposed surfaces and a thickness between the opposed surfaces, the layers arranged in a stack in a thickness direction, and the volume portions are arranged in a polygonal pattern within each layer.

51. The method of any of 39-50, wherein the polygonal pattern within each layer is a hexagonal pattern, and the hexagonal pattern within each layer is rotated in a plane parallel to the opposed surfaces with respect to the hexagonal pattern in an adjacent layer.

52. The method of any of 39-51, wherein the polygonal pattern within each layer is rotated with respect to the polygonal pattern in an adjacent layer to provide a Bouligand structure.

53. The method of any of 39-52, wherein each of the volume portions is a Wigner-Seitz unit cell.

54. The method of any of 39-53, wherein the anisotropic structure comprises a rotating herringbone structure, rows of stacked herringbone structures, or a Bouligand structure.

55. The method of any of 39-54, wherein the anisotropic structure of the volume is anisotropic in two dimensions or in three dimensions.

56. The method of any of 39-55, wherein the geometric shape of the particles is a platelet, flake, filing, fiber, rod, or whisker.

57. The method of any of 39-56, wherein the particles have a longest dimension ranging from 200 nm to 1000 μm.

58. The method of any of 39-57, wherein the particles have a longest dimension ranging from 1 μm to 20 μm.

59. The 58 method of any of 39-58, wherein the particles have an aspect ratio of the longest dimension to the shortest dimension of at least 2.

60. The method of any of 39-59, wherein the particles have an aspect ratio of the longest dimension to the shortest dimension ranging from 2 to 200.

61. The method of any of 39-60, wherein the particles are magnetically responsive particles comprising at least in part a magnetic material.

62. The method of any of 39-61, wherein the magnetic material comprises a ferromagnetic material, a paramagnetic material, a superparamagnetic material, iron oxide, iron, cobalt, nickel, an iron alloy, a cobalt alloy, or a nickel alloy.

63. The method of any of 39-62, wherein the magnetic material comprises particles, microbeads, nanoparticles, filings, fibers, flakes, rods, whiskers, or platelets.

64. The method of any of 39-63, wherein the magnetically responsive particles comprise a non-magnetic material coupled with the magnetic material.

65. The method of any of 39-64, wherein the non-magnetic material comprises aluminum oxide, calcium phosphate, copper, glass, calcium sulfate, nylon, polystyrene, or silicon carbide.

66. The method of any of 39-65, wherein the non-magnetic material comprises discontinuous fibers, rods, platelets, flakes, or whiskers.

67. The method of any of 39-66, wherein the non-magnetic material is coated with the magnetic material.

68. The method of any of 39-67, wherein the matrix material is a polymer and the particles comprise aluminum oxide platelets coated with a magnetically responsive material.

69. The method of any of 39-68, wherein the matrix material is a thermoset polymer, polyurethane, silicone, acrylic, acrylonitrile butadiene styrene, nylon, poly lactic acid, polycarbonate, polyethylene, polypropylene, polystyrene, polyvinyl chloride, polytetrafluoroethylene, polymethylmethacrylate, collagen, gelatin, or alginate.

70. A method of making the composite material of any of 1-38.

DESCRIPTION OF THE DRAWINGS

FIG. 6A illustrates kink angle $\theta^*$ and FIG. 6B illustrates kink load $G(\theta^*)/\Gamma_{min}$ plotted against the $\mathcal{A}$, the fracture energy anisotropy. The dashed line shows the optimal tilt angle for platelets $\alpha_\Gamma$ to produce the toughest composite. "X" marks show parameters used for phase-field simulations shown in FIGS. 6C and 6D.

FIG. 7A illustrates polymer matrix composites exhibiting herringbone patterned reinforcements that were fabricated with 3D magnetic printing exhibiting different angles of herringbone patterns including (from left to right) $\alpha_\Gamma=\pm 0$, $\alpha_\Gamma=\pm\pi/4$, $\alpha_\Gamma=\pm\pi/3$, $\alpha_\Gamma=\pm\pi/18$, and $\alpha_\Gamma=\pm\pi/2$. Conventional composite design suggests $\alpha_\Gamma=\pm\pi/2$ provides the highest fracture toughness.

FIG. 7B illustrates pre-notched samples as in FIG. 7A that were fractured under Mode I tension resulting in collections of fracture path behaviors traced in the colored overlays on the associated schematics.

DETAILED DESCRIPTION

Figure 1A:
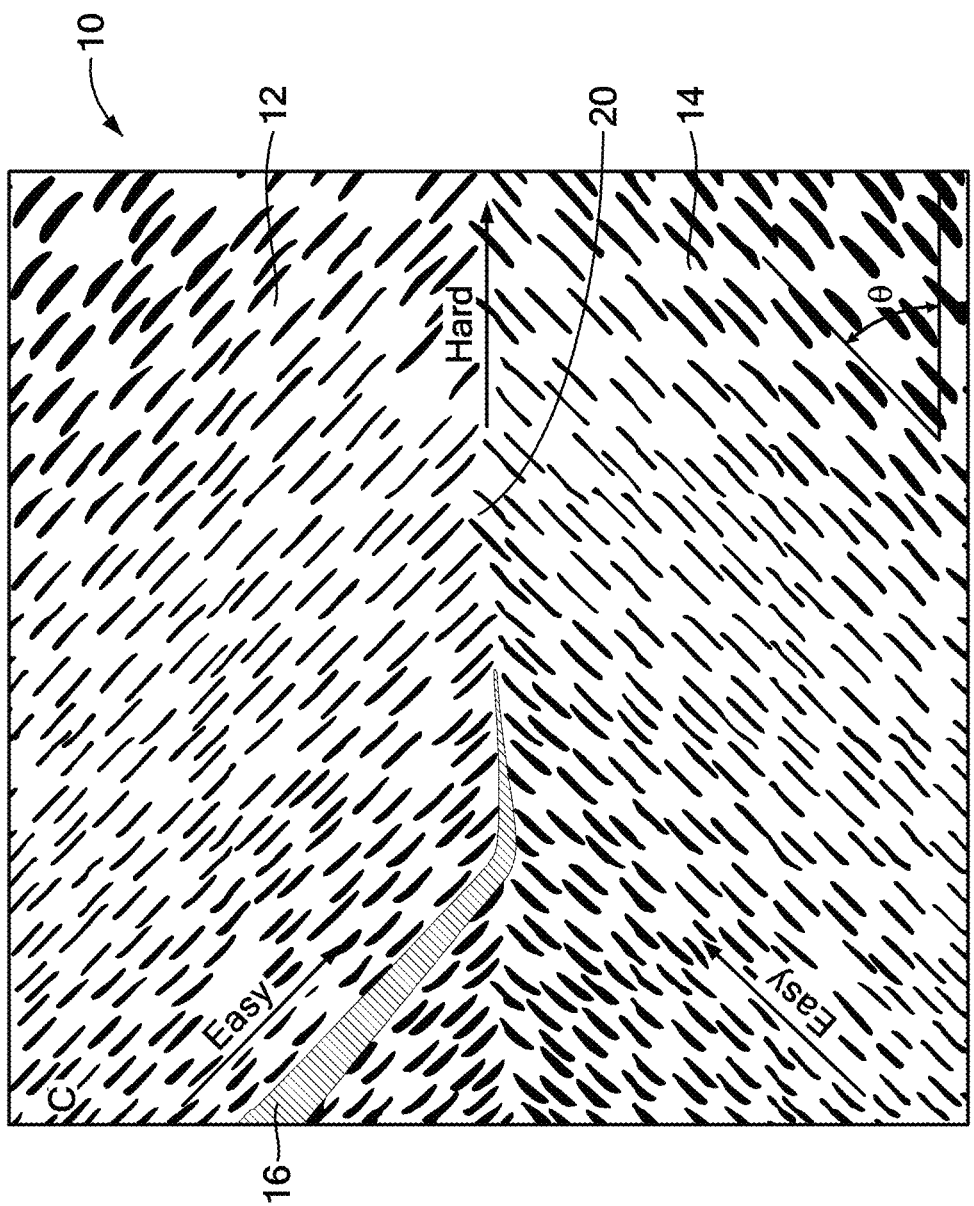
FIG. 1A depicts a herringbone architecture applied to ceramic reinforced polymer composites that can serve as a way to attract and pin propagating cracks at internal interfaces that exhibit enhanced toughness compared to monolithic counterparts.

The technology described herein relates to composite materials of a matrix material reinforced with particles oriented in a variety of herringbone architectures to increase fracture toughness. In some embodiments, the composite material is a polymeric composite reinforced with alumina micro-platelets. The herringbone architectures can result in remarkable toughening behavior, described herein using linear elastic fracture mechanics (LEFM) theoretical analysis as well as numerical and experimental studies. The technology highlights how for herringbone architectures below a critical angle, the material can effectively trap developing cracks along a cleavage plane of the architecture, driving the crack in a direction of high fracture energy (toughness). These herringbone patterns can be extended to enhance fracture toughness in the second in-plane dimension through patterning herringbones in two-dimensional mosaic patterns. Patterning of composites in a herringbone architecture can provide a straightforward way to boost the overall material toughness.

The experimental measurements, described below, showed that near the optimal angle, initial fracture toughness demonstrated substantial improvements including average increases of 185% and 549% in $G_C$ compared to the monolithic samples of $\alpha_\Gamma=\pi/2$ and $\alpha_\Gamma=0$, respectively. The experimental observations combined with the numerical simulations, also highlight that the optimal structure needs to be chosen not too close to the theoretical LEFM optimal angle due to their augmented susceptibility to T-stress instabilities.

The composite materials with the herringbone patterns described herein can provide an increase in toughness 3 to 5 times greater than that of composite materials with conventional filler alignments. The technology can be applied to 3D composite printing to effectively toughen parts independent of local geometries and applied stresses. The technology can significantly increase the initial fracture resistance of a polymer system reinforced with filler. In some embodiments, the technology can provide increased fracture toughness isotropically, such that the direction or orientation of the pattern relative to external load and geometry does not matter significantly. The technology can be advantageous since toughness can be a difficult performance metric to increase.

The technology can be widely applicable and transferrable. The technology can be applied in stereolithography apparatus (SLA) 3D Printing of fiber reinforced composites. The technology can be applied in carbon fiber composites industries that employ milled carbon fiber as an additional toughening agent. It can be applied to fiber glass systems, carbon fiber systems, and ceramic matrix composite systems. The technology can be applied in injection molding flows for filled systems. The technology can be applied to provide isotropic toughening of SLA printed composites and toughening of interlaminate materials. The technology can be applied to enhance the toughness in discontinuous fiber reinforced composites, in some case by three times or more. The technology can be advantageous, because toughness can be a difficult performance metric to increase.

By way of further explanation, a variety of mechanisms have been proposed to increase the initial resistance of a polymeric system to the formation of a fracture, as well as its capability to impede the fracture's propagation through the material. Many of these efforts have taken the form of adding filler particles possessing a higher mechanical strength and stiffness to the weaker bulk polymer, increasing its resistance to tensile or mode I fracturing through the transference of mechanical stress from the polymer to the dispersed particles within the composite. A general understanding is that orienting fillers parallel with the principle stress direction is the best way to increase material toughness. The technology described herein provides a further increase in toughness by introducing conflicting alignment patterns of filler within the composite. These patterns range from herringbone patterns for one dimensional (1D) toughening to more complex patterns including herringbone weaves for two dimensional (2D) and three dimensional (3D) toughening. Such patterns can be fabricated with 3D magnetic printing techniques, although a variety of fabrication techniques can be used.

Specifically, the orientation of microscale reinforcement plays a role in the anisotropic fracture toughness of such structures. For example, shear-aligned discontinuous fibers in glass-filled nylon formed by injection molding and weave-aligned continuous carbon fiber epoxy can demonstrate toughness in the direction perpendicular to the reinforcement particles, tending to deflect cracks away from this axis based on maximizing the energy release rate. Therefore, deflected cracks no longer propagate perpendicular to the reinforcing fibers, meaning that the microstructure is not toughening to its full potential.

An ability to finely tune composite microstructures can enable tuning macroscopic part performance through the local control of discontinuous fibers. Complex structures can be possible by a variety of manufacturing techniques, allowing for significant increases in the resolution of sample features and precision control over the filler materials. Selective irradiation of voxel-specific areas, combined with a magnetic alignment system and fillers pre-doped with ultra-high magnetic response iron oxide nanoparticles, as in Martin et. al., can be used to construct 2D and 3D structures containing multiple regions of differing alignments. (Martin, J. J.; Fiore, B. E.; Erb, R. M., Designing bioinspired composite reinforcement architectures via 3D magnetic printing. *Nature Communications* 2015, 6 (1), 8641.) Other techniques, such as those employed by Ferrand et al., have achieved high-precision alignments via the use of a unique form of slip-casting, in which a fluid suspension of particles can be deposited into a pre-designed, porous mold, utilizing capillary forces to remove the fluid and magnetic fields to control the particle alignment. (Le Ferrand, H.; Bouville, F.; Niebel, T. P.; Studart, A. R., Magnetically assisted slip casting of bioinspired heterogeneous composites. *Nature Materials* 2015, 14 (11), 1172-1179.)

In the technology described herein, three-dimensional (3D) magnetic printing techniques are used to fabricate thermoset polymers reinforced with discontinuous ceramic particles ordered in highly-oriented "herringbone" architectures. The angular contrast in this structure creates an optically antagonistic pattern termed "herringbone" from the angled skeletal structure of the herring fish.

In some embodiments, a composite material can comprise a volume of a matrix material and a plurality of particles disposed within the matrix material. The particles can have a geometric shape with a longest dimension and a shortest dimension different from the longest dimension. The volume can have an anisotropic structure comprising a plurality of volume portions, adjacent volume portions abutting along an interface comprising a surface forming a common boundary between the adjacent volume portions. The particles within any pair of the adjacent volume portions can be disposed in orientations in which the geometric shape with the longest dimension is disposed at a non-orthogonal angle with respect to the interface, with the orientation of the particles in one of the pair of the adjacent volume portions differing from the orientation of the particles in the of the pair of the adjacent volume portions. The orientations of the particles in the pair of the adjacent volume portions can be selected so that a crack propagating on a crack propagation path through the one or the other of the pair of the adjacent volume portions stops at or deflects to propagate along the interface. This anisotropic structure can be extended in two dimensional and three dimensional directions. The volume portions can have a dimension that is at least 10 times a dimension of the particles.

In some embodiments, at least a subset of the plurality of the volume portions are arranged in the mosaic pattern to be adjacent to at least three other volume portions. In some embodiments, the non-orthogonal angles between the particles within the adjacent volume portions and the interface between the adjacent volume portions are a function of a fracture energy anisotropy of the composite material. In some embodiments, the non-orthogonal angle of each of the volume portions is selected such that a fracture energy anisotropy of the composite material is equal to or greater than 3. In some embodiments, the anisotropic structure provides a reduction of a driving force of a crack tip regardless of crack initiation location or direction as the crack tip propagates through the volume. In some embodiments, the anisotropic structure provides a mechanical property tuned along a selected direction. In some embodiments, the anisotropic structure provides compressive loading reinforcement, tensile loading reinforcement, or both compressive loading and tensile loading reinforcement. In some embodiments, the anisotropic structure provides increased fracture toughness along the interface.

Figure 1B:
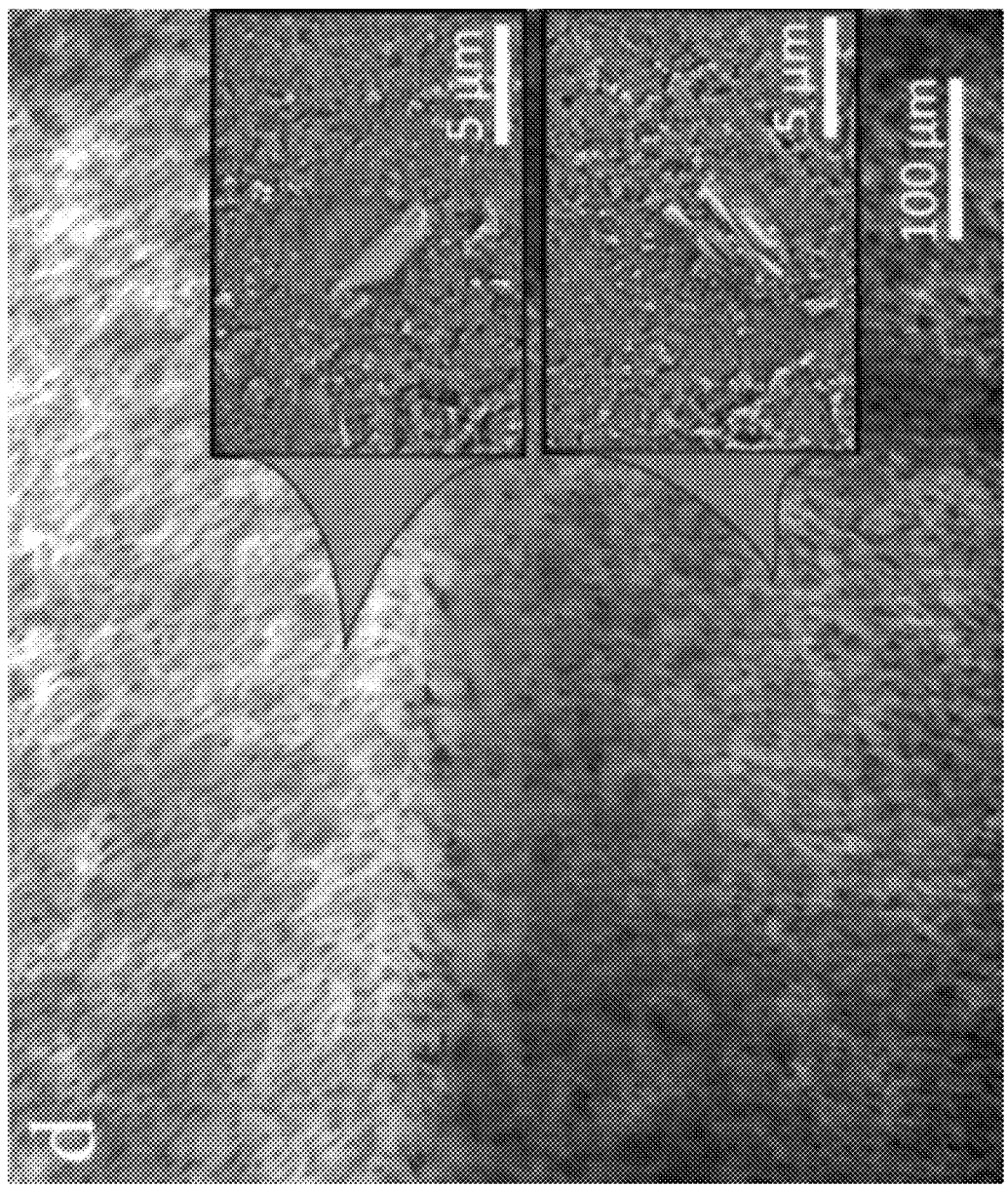
FIG. 1B depicts herringbone architectures that have been manufactured with 3D magnetic printing to create thermoset polymers reinforced with oriented alumina. In this micrograph the spine is shown with optical microscopy and scanning electron microscopy (insets) in which the microstructure is comprised of $\theta=-45°$ and $\theta=+45°$ oriented alumina platelets, respectively, above and below the spine.

More particularly, FIG. 1A depicts a herringbone microstructure 10 that exhibits antagonistic patterns with two regions or volume portions 12, 14 that can deflect a crack 16 toward the interface 20, or "spine," that separates the regions. The interface is a surface forming a common boundary between two adjacent regions or volume portions. The regions are formed from a matrix material with reinforcing particles disposed therein aligned in a particular orientation, indicated by angle $\Theta$. Cracks propagating through the particles can be effectively pinned at the interface and driven forward against a strong orientation of the reinforcement filler. The herringbone architecture represents a minimal design methodology for enhancing the fracture toughness in one dimension of a composite material by forcing the crack to propagate along a hard axis and preventing deflection. FIG. 1B is a photomicrograph of such a microstructure, created with a 3D magnetic printing technique, as explained further below.

Figure 2A:
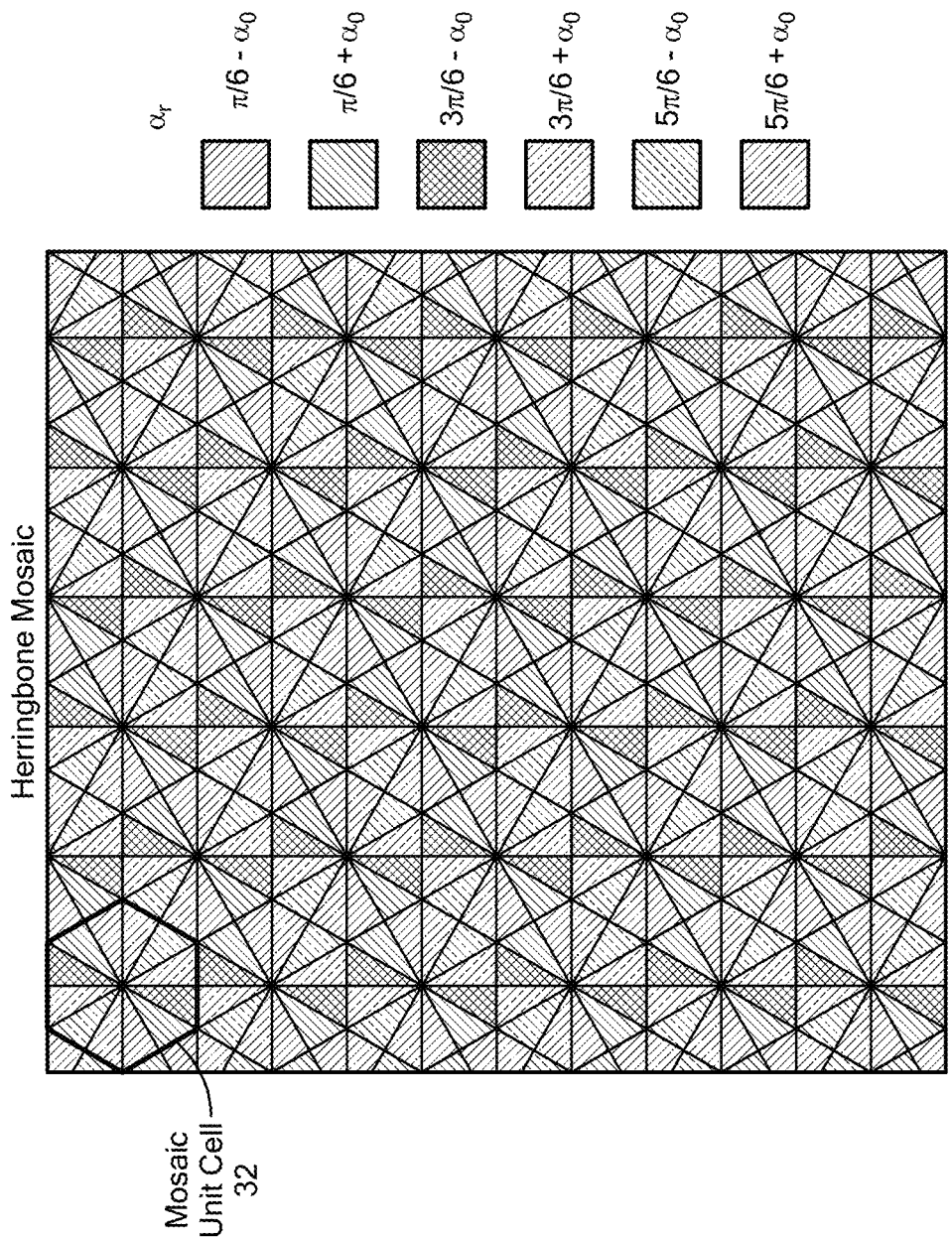
FIG. 2A illustrates a herringbone mosaic pattern in which the unit cell is a hexagon containing six herringbone patterns oriented every $\pi/3$.
Figure 2B:
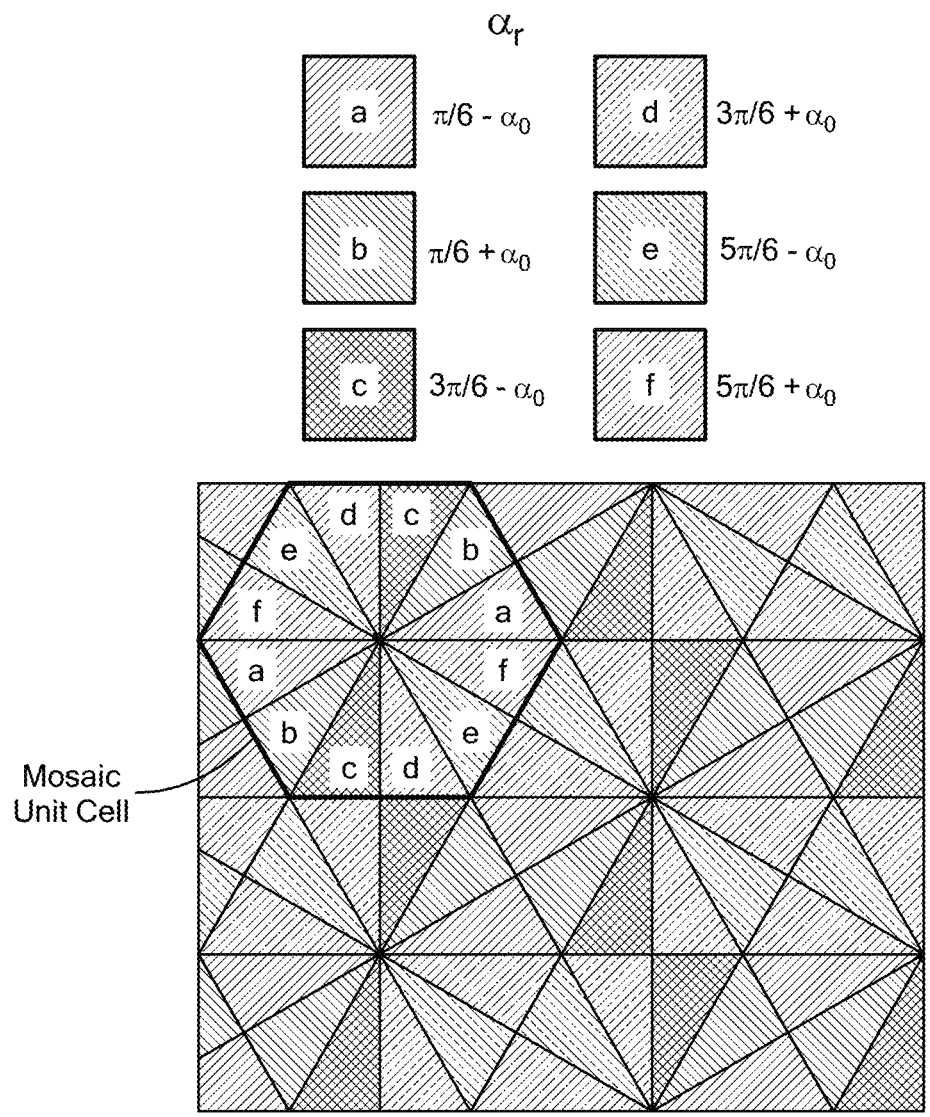
FIG. 2B illustrates a key to the mosaic pattern in FIG. 2A.
Figure 3A:
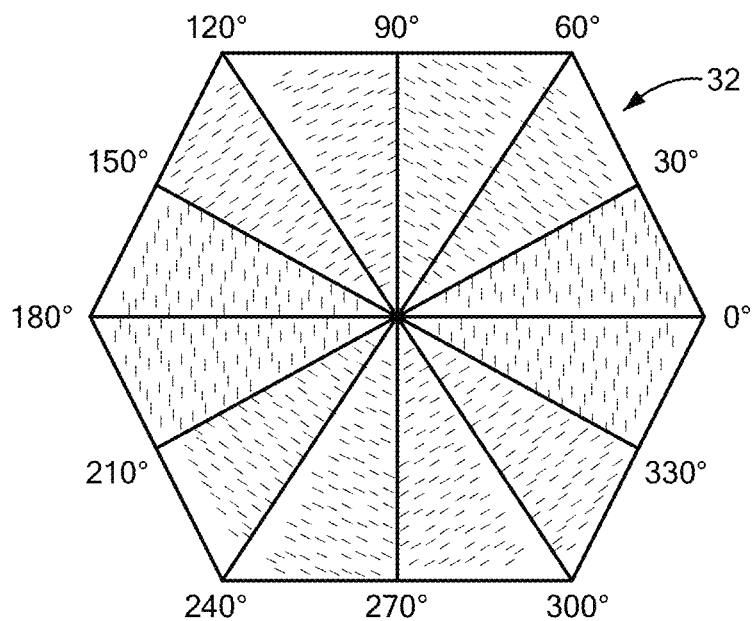
FIGS. 3A and 3B illustrate various embodiments of non-orthogonal angles of the particles.
Figure 3B:
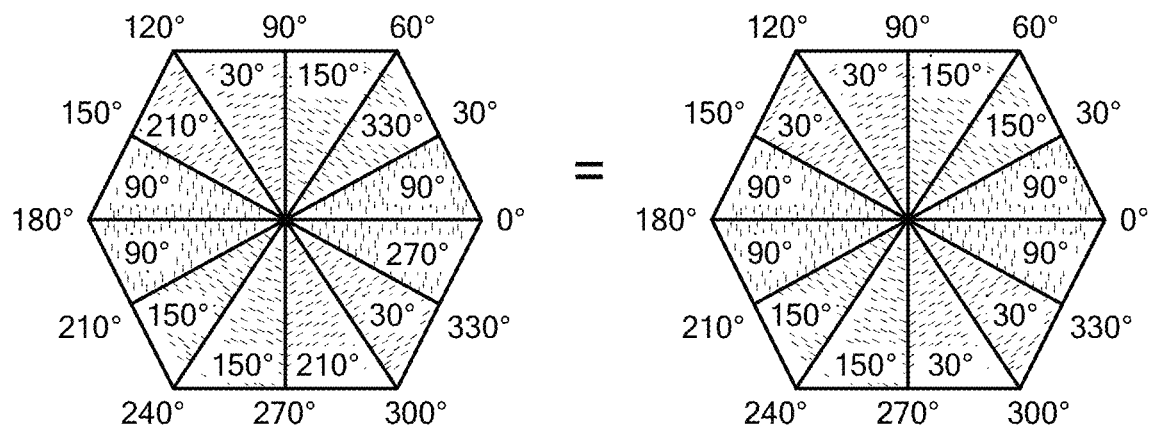
Figure 3C:
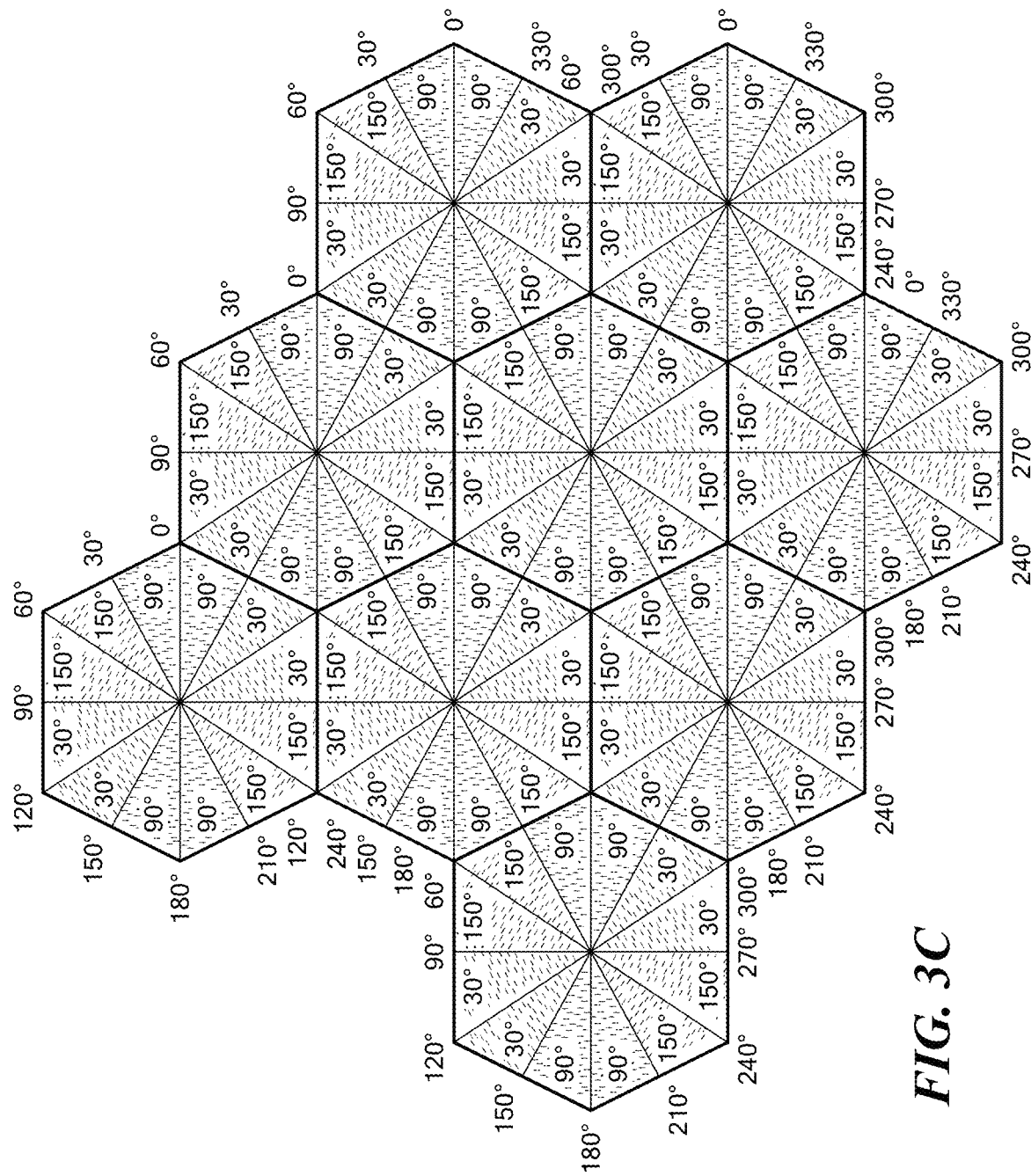
FIG. 3C illustrates an extension of the mosiac pattern.

This architecture can be extended into two-dimensions and three dimensions through tiling the herringbone pattern into various mosaic patterns. Referring to FIGS. 2A and 2B, a hexagonal mosaic pattern of a herringbone architecture is illustrated, in which a layer of a composite material is patterned with a plurality of hexagonal unit cells 32. Each hexagonal unit cell can be subdivided into a number of triangles, each serving as a volume portion within the layer. The reinforcing particles within each triangle are oriented differently from the reinforcing particles in adjacent triangles, such that the interfaces between each triangle can effectively pin or deflect the propagation path of a crack. FIGS. 2A and 2B illustrate twelve triangles; however six or other multiples of six can be used. Similarly, other polygonal shapes, such as an octagonal shape, can be used. Similarly a composite material can be provided as stacked layers, such as of layers of the hexagonal or other mosaic pattern. The mosaic pattern in adjacent layers can be offset or displaced, and/or the orientation of the reinforcing particles within each volume portion can be differently oriented from the orientation of the particles in adjacent volume portions of adjacent layers. In this manner, composite materials exhibiting herringbone mosaic patterns demonstrate not only enhanced fracture toughness relative to fully aligned monolithic composite material counterparts but also isotropic fracture toughness independent of the direction of the initial crack path. FIGS. 3A and 3B schematically illustrate embodiments of various non-orthogonal angles of the particles in adjacent volume portions. FIG. 3B illustrates ways of indicating the non-orthogonal angles in degrees. FIG. 3C schematically illustrates an extension of a mosaic pattern in two dimensions.

In some embodiments, a herringbone alignment architecture can employ a Bouligand structure, which can provide effective reinforcing techniques for certain loading conditions. In particular, Bouligand structures can be altered to accommodate a series of cells or volume portions, each with reinforcing particles aligned in a particular orientation. The interfaces between each cell or volume portion can effectively pin a crack or drive propagation of the crack along the interface. In some embodiments, the cells can be arranged with the herringbone orientations rotating in a descending or ascending manner. In some embodiments, a composite material can be provided in stacked layers, each layer composed of rows of stacked herringbone architecture. In some embodiments, the architectures can combine both compressive and tensile loading reinforcement.

Figure 4A:
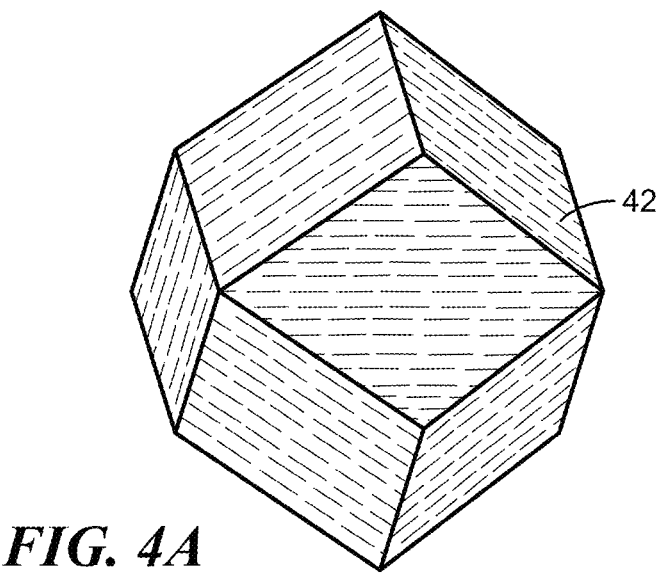
FIG. 4A is a schematic illustration of a Wigner-Seitz cell.
Figure 4B:
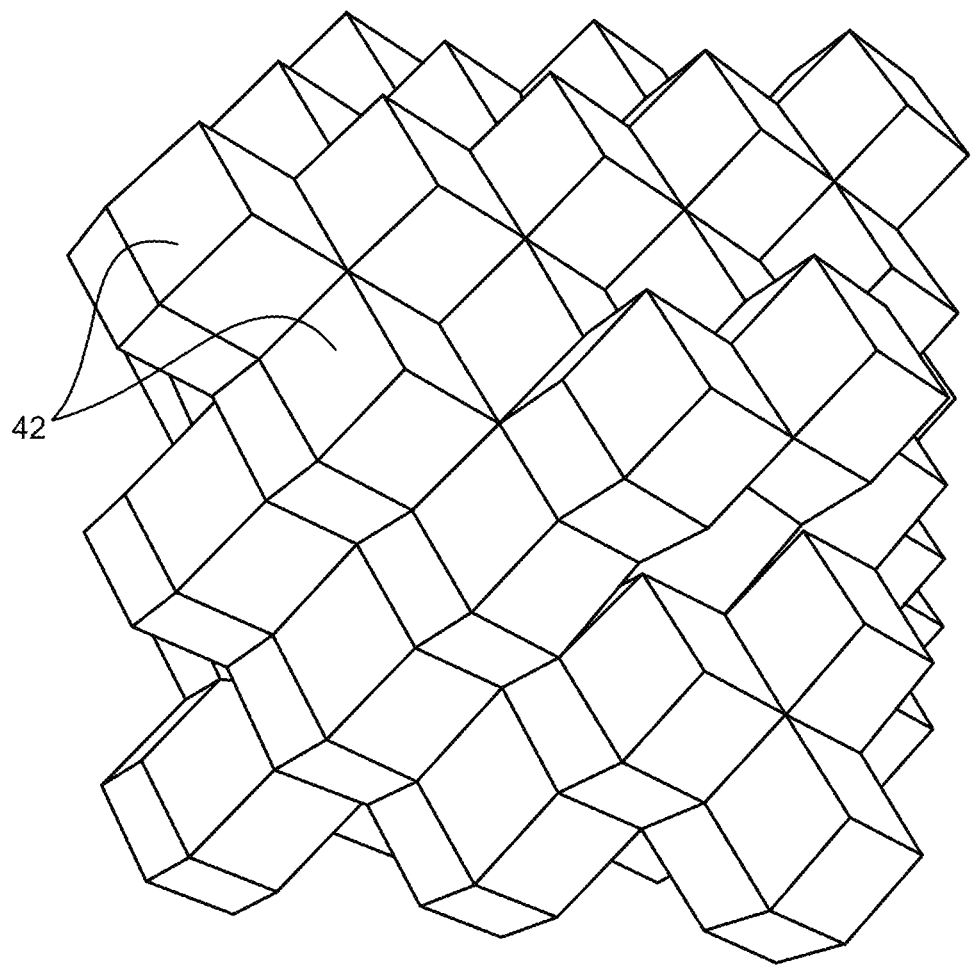
FIG. 4B is a schematic illustration of a rhombic dodecahedron formed of Wigner-Seitz cells.
Figure 5:
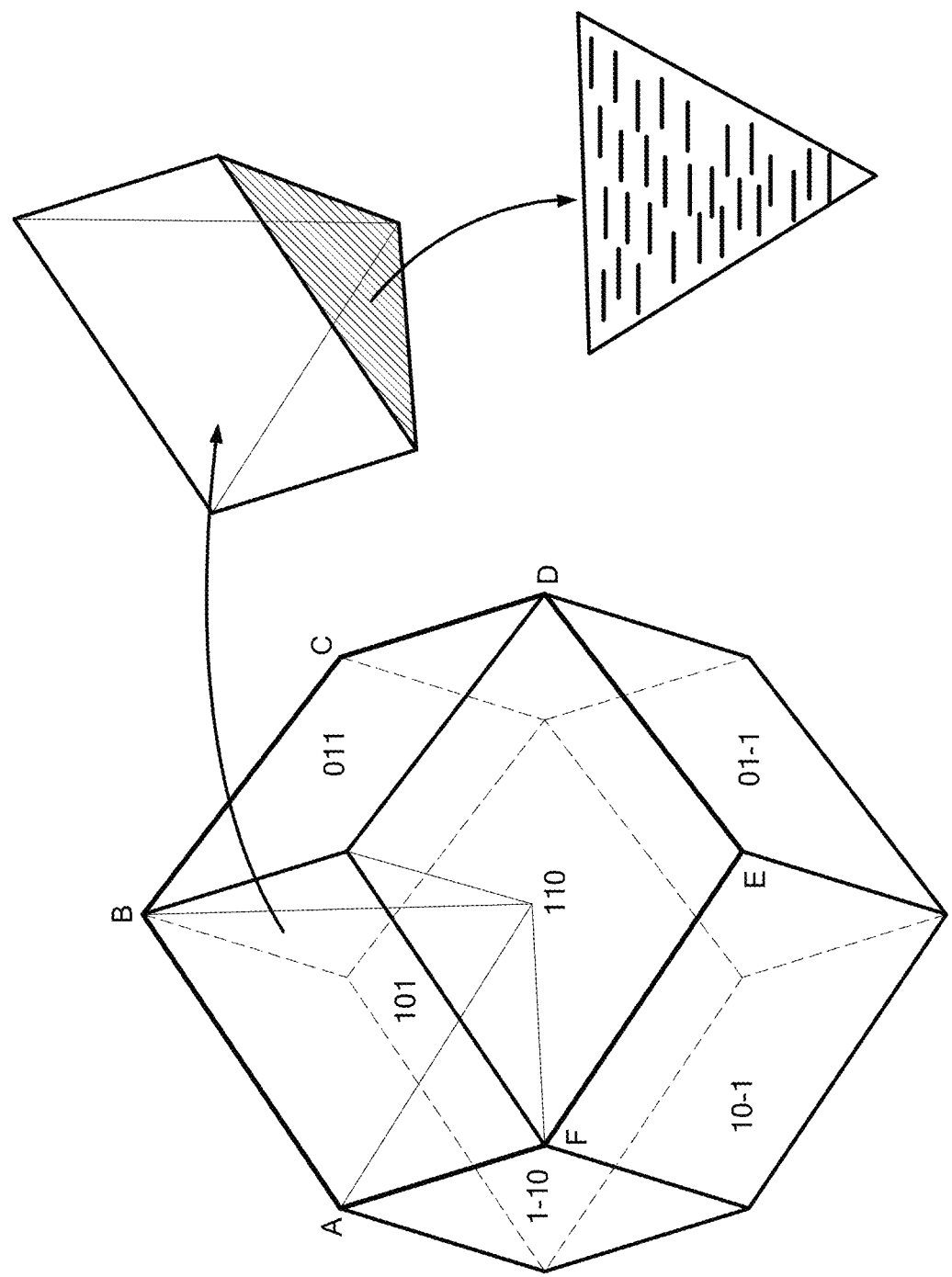
FIG. 5 is a schematic illustration of unit cells such as Wigner-Seitz cells used to build a whole material to form a structure to create a herringbone architecture active in all three-dimensional directions.

A further example geometry for a 3D pattern is that of a Wigner-Seitz cell 42, illustrated in FIGS. 4A and 4B. The Wigner-Seitz cell is an abstraction used for modeling sections of a crystal lattice structure. A form of a so-called "primitive cell" (a crystalline unit cell that encompasses only one lattice point), the Wigner-Seitz cell represents the volume enclosed by all points in space which are closer to a single lattice point than any other. In effect, it represents a volume of the smallest possible unit cell within a crystalline structure, and thereby the smallest periodic structure within the crystalline structure. Some embodiments of the present composite material can replicate this structure to create a periodic alignment architecture within a larger, macroscale 3D geometry made up of any desired number, for example, tens, hundreds, thousands, or more, of these cells (FIG. 5). FIG. 5 also schematically illustrates a particle orientation in one volume portion. This structure reduces the driving force of a crack tip over and over again, continuously increasing or maintaining its critical energy release rate, regardless of initiation location or direction as the crack tip encounters one new cell after another while propagating through a material.

In order to calculate the fracture energy required to initiate a fracture in this "pinning" architecture, the angle at which the crack is anticipated to propagate immediately following initiation ($\theta^*$) is first determined. This angle, generally referred to as the "kinking angle," is determined by the competition between the rate of energy released by the crack tip $G(\theta)$ (i.e., the energy of the bonds severed to produce a new surface) and the fracture energy of the crack tip itself, $\Gamma(\theta)$. This initial direction, therefore, is whichever "kink" angle produces the greatest decrease in the energy dissipated by the fracture. The resulting crack's fracture energy is a function of both this kinking/deflection angle and the material's so-called fracture energy anisotropy, $\mathcal{A}$, a value determined by the ratio of the fracture energy for platelets aligned parallel to the direction of Mode I applied stress $$\sim \frac{\pi}{2}$$

radians) to the fracture energy of platelets aligned perpendicular to Mode I applied stress (~0 radians), expressed as $$\mathcal{A} = \Gamma\left(\frac{\pi}{2}\right)/\Gamma(0).$$

These methods for solving these equations can be expanded to determine the approximate fracture energy values for a variety of particle alignment angles ($\pm\alpha_\Gamma$) ranging from parallel to perpendicular global alignments. In the case of the herringbone architecture, these calculations account for the effects of two separate, though symmetric, alignment architectures, with the total initial fracture energy being a function of the system's estimated kinking angle, particle alignment angle, and the fracture energy anisotropy. This allows for the approximation of the energy released by the fracture initiation $G_c$, as well as estimating a range of fracture energy values for the full gamut of possible particle alignment angles.

The volume percentage of particles to matrix material can be selected to achieve a desired fracture energy anisotropy.

The volume percentage can depend on the materials selected and the size of the particles. Particle size can range from nanoparticles to microparticles to macroparticles. As use herein, nanoparticles include particles having a longest dimension in the range of 1 to 1000 nm ($10^{-9}$ m to $10^{-6}$ m). Microparticles include particles having a longest dimension in the range of 1 to 1000 μm ($10^{-6}$ m to $10^{-3}$ m). Macroparticles include particles having a longest dimension above $10^{-3}$ m.

In one example, a macro-scale anisotropic fracture energy emerges for a structure of several centimeters in size that is greater than 3000 times a particle size. In one example, using $Al_2O_3$ particles having a dimension of 7.5 μm dispersed in a polymer resin matrix material formed from EBECRYL 230 urethane acrylate and isobornyl acrylate, a volume percentage of ~4% was found to achieve an anisotropy of 3.1.

The alignment architectures, and the methods used to produce them, can have applications in the study of mechanical principles and the production of further methods of creating common commercial products of superior robustness and longevity.

The results from experiments, discussed further below, point to a variety of additional possibilities in the realms of material strengthening. The ability to align filler particles into precise, complex internal architectures has shown an ability not only to elevate a polymer's initial resistance to fracture above that of monolithically aligned or randomly aligned systems, but to create patterns that can overcome the normally anisotropic nature of this strengthening effect.

The full potential of the principles uncovered during these herringbone architecture studies can be achieved through the design of further sample geometries which can apply the herringbone strengthening along all possible degrees of freedom.

The composite material can be fabricated from a variety of matrix materials and particles. In some embodiments, the composite material can be a polymer matrix material and the particles can be reinforcing particles of a ceramic or other material. In some embodiments, the reinforcing particles can be aluminum oxide platelets.

In some embodiments, the matrix material can be a thermoplastic polymer, polyurethane, silicone, acrylic, ABS, nylon, PLA, polycarbonate, polyethylene, polypropylene, polystyrene, polyvinyl chloride, polytetrafluoroethylene. In some embodiments, the matrix material can be collagen, gelatin, or alginate. In some embodiments, the matrix material can be a combinations of materials.

In some embodiments, the particles can comprise platelets, filings, fibers, flakes, rods, whisker, microbeads, or nanoparticles. In some embodiments, the particles can be anisotropic in shape in at least one dimension. In some embodiments, the particles can have a longest dimension ranged from 200 nm to 1000 μm. In some embodiments, the particles can have an aspect ratio ranging from 2 to 200.

In some embodiments, the particles can be a magnetically responsive material. In some embodiments, the magnetically responsive material can be a ferromagnetic material, a paramagnetic material, a superparamagnetic material, iron oxide, iron, cobalt, nickel, an iron alloy, a cobalt alloy, or a nickel alloy. In some embodiments, the magnetically responsive particles can comprise a non-magnetic material coupled with a magnetic material. In some embodiments, the non-magnetic material can be aluminum oxide, calcium phosphate, copper, glass, calcium sulfate, nylon, polystyrene, or silicon carbide. In some embodiments, the non-magnetic material can comprise discontinuous fibers, rods, platelets, flakes, or whiskers. In some embodiments, the non-magnetic material is coated with the magnetic material.

A variety of three-dimensional manufacturing techniques can be used to fabricate the composite materials described herein. Suitable manufacturing techniques include, without limitation, additive manufacturing (such as three-dimensional printing techniques), molding, and tape casting, In some embodiments, a peel-off stereolithographic printer system, capable of selective voxel irradiation and three dimensional magnetic alignment, can be used to create such structures. This permits the creation not only of additional three dimensional structures, but customized interior filler alignments which can provide finely tuned mechanical properties along any axis desired. Such manufacturing techniques provide for rapid prototyping and fabrication of structures incorporating herringbone and other patterns and geometries that provide a variety of internal interfaces and inhomogeneities and that can incorporate a variety of mechanical and material properties. Further suitable three-dimensional manufacturing techniques are described in WO 2015/188175, entitled "Additive Manufacturing of Discontinuous Fiber Composites Using Magnetic Fields," and WO 2017/100271, entitled "Direct Write Three-Dimensional Printing of Aligned Composite Materials," both of which are incorporated by reference herein.

This technology provides polymeric composites reinforced with alumina micro-platelets oriented in monolithic and herringbone architectures. It was demonstrated that the herringbone architectures resulted in remarkable toughening behavior using LEFM theoretical analysis as well as numerical and experimental studies. The technology highlighted how for herringbone architectures below a critical angle, the samples could effectively trap developing cracks along the cleavage plane of the architecture, driving the crack in a direction of high fracture energy (toughness). The experimental measurements showed that near the optimal angle, initial fracture toughness demonstrated substantial improvements including average increases of 185% and 549% in $G_C$ compared to the monolithic samples of $\alpha_\Gamma=\pi/2$ and $\alpha_\Gamma=0$, respectively. The experimental observations combined with the numerical simulations, also highlighted that an optimal structure can be chosen not too close to the theoretical LEFM optimal angle due to their augmented susceptibility to T-stress instabilities. These herringbone patterns can be extended to enhance fracture toughness in the second in-plane dimension through patterning herringbones in two-dimensional mosaic. Patterning of composites in a herringbone architecture can provide a straightforward way to boost the overall material toughness. Further, herringbone reinforcement as described herein can be achieved using techniques other than the 3D magnetic printing technique as described herein.

The technology described herein can provide conflicting alignment patterns that have been investigated and demonstrated a 3-5× toughness improvement over other conventional filler alignments. The technology can be applied to 3D composite printing to effectively toughen parts independent of local geometries and applied stresses. The technology has been confirmed to significantly increase the initial fracture resistance of a polymer system reinforced with filler. The technology can perform well isotropically; direction/orientation of pattern relative to external load and geometry does not matter significantly.

Numerical Simulation

The crack path in an anisotropic solid is controlled by the competition between the energy release rate from the crack tip and the fracture energy. As such, in most simple anisotropic structures (for high enough anisotropy), the crack driven against the tough direction deflects. The technology herein provides a strategy for designing a tough architecture by forcing the fracture to propagate along the tough path. The effective manufacturing of such hierarchical composites is demanding both in terms of the ability to control a microstructure's orientation and its chemistry.

The herringbone architecture provides a minimal design by which the crack is trapped at the boundary of two mirror-symmetric platelet orientations. This is achieved by linear elastic fracture mechanics (LEFM) calculations where the platelet angles are optimized to enforce propagation in the toughest direction possible without deflection. To calculate the platelets' orientation, the deflection angle of the crack propagating at the mirror-symmetry plane of the herringbone architecture is calculated. It is assumed that the deflection angle is governed by maximum energy dissipation such that $$\theta^* = \mathrm{argmax}(G(\theta) - \Gamma(\theta)) \quad (1)$$

It is assumed that the elastic properties of the herringbone composite remains isotropic and use closed-form expressions to calculate the energy release rate from stress-intensity-factors as a function of the kink angle where pure Mode-I loading is assumed. Furthermore, it is assumed that the fracture energy anisotropy is of the form:

$$\Gamma(\theta; \mathcal{A}) = \Gamma_{0\mathcal{A}} \sin^2(\theta) + \mathcal{A}^{-2} \cos^2(\theta) \quad (2)$$

where $\theta$ is the angle of the crack with respect to the platelets' tangent, $\Gamma_{0\mathcal{A}}$ is the maximum fracture toughness attainable at fracture energy anisotropy $\mathcal{A}$, and $\mathcal{A} = \Gamma(\pi/2)/\Gamma(0)$ is the fracture energy anisotropy.

Using Eq. 2, the fracture energy can be constructed for a Herringbone architecture where the platelets are rotated by $\mp \alpha_\Gamma$ (counterclockwise for $\theta > 0$ and clockwise for $\theta < 0$) from the loading direction $$\Gamma_{HB}(\theta; \mathcal{A}, \alpha_\Gamma) = \Gamma(|\theta| + \alpha_\Gamma, \mathcal{A}) \quad (3)$$

The kink angle can be found for given fracture energy anisotropy and for all platelet orientations $\pi/4 \leq \alpha_\Gamma \leq \pi/2$, where $\alpha_\Gamma = \pi/2$ corresponds to a monolithic perpendicular architecture with platelets parallel to the loading direction and $\alpha_\Gamma = \pi/4$ corresponds to herringbone structure with platelets at oriented at $\mp \pi/4$. The kink angle can then be calculated by varying the load $G(0)/\Gamma_{0\mathcal{A}}$ between 0 and 1 and finding the first instance of propagation where $G(\theta^*) = \Gamma_{HB}(\theta; \mathcal{A}, \alpha_\Gamma)$.

Figure 6A:
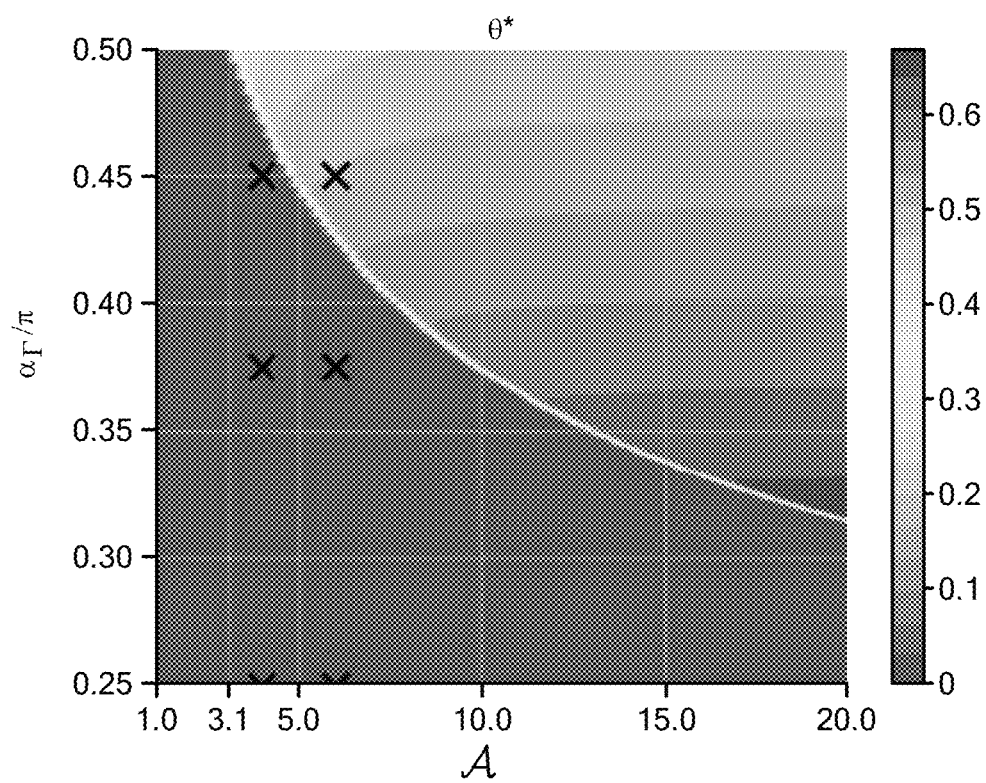
FIGS. 6A and 6B illustrate closed-form LEFM results for kinking in herringbone structure.
Figure 6B:
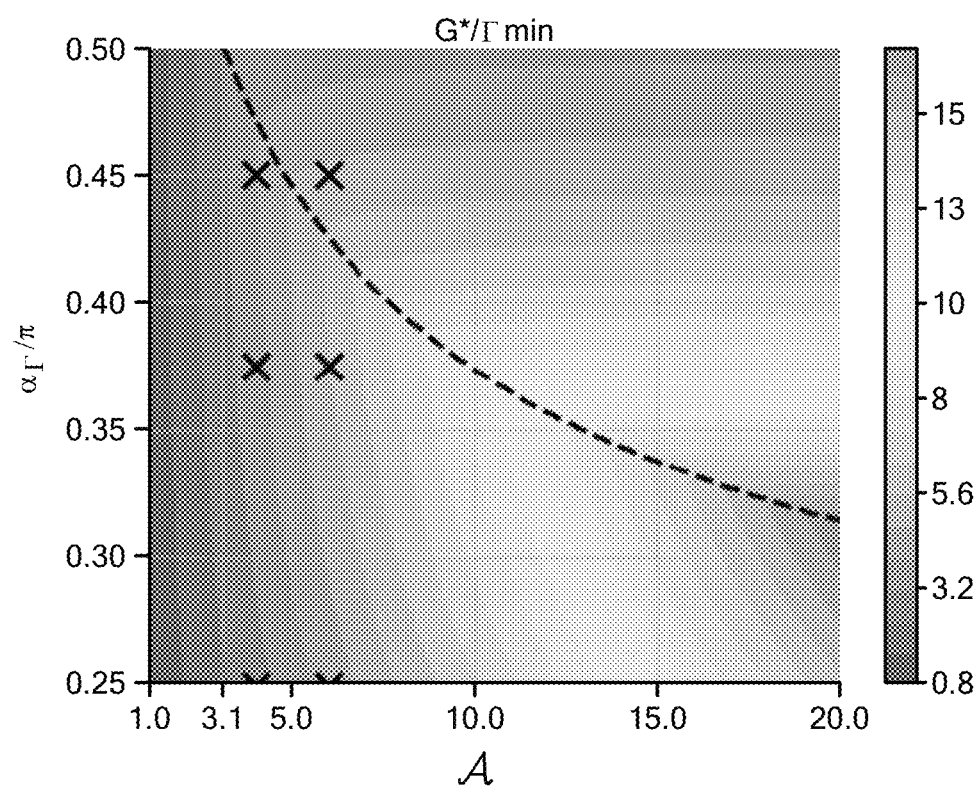

FIG. 6A shows the results of the LEFM calculation for the kink angle. For low anisotropy $\mathcal{A} \leq 3.1$, the cracks do not kink. For higher fracture energy anisotropy, the cracks kink in the perpendicular architecture, but if the platelets are rotated backward, the kinking is eventually suppressed, and the crack is trapped at the mirror-symmetry boundary. This can be intuitively understood since in the herringbone architecture, $\theta = 0$ is a cleavage angle; thus for the crack to kink, it has to propagate in a tougher direction. FIG. 6B shows the load required for kinking versus the minimum fracture energy. It should be noted that without prior measurement, it is not easy to relate $\Gamma_{0\mathcal{A}}$ at different $\mathcal{A}$ values. Here to compare values at different fracture energy anisotropies, perfect toughening is assumed where the maximum fracture energy at given anisotropy scales as $\Gamma_{0\mathcal{A}} = \mathcal{A} \Gamma_{min}$. Simply put this means that the fracture energy for propagation along the platelets stays constant and increases linearly with $\mathcal{A}$ for propagation perpendicular to the platelets. As expected, the maximum dissipation through facture is attained when the crack is trapped at the cleavage angle. It should be noted, however, that toughening never reaches the maximum value $\mathcal{A} \Gamma_{min}$ since the trapped crack effectively propagates against an ensemble of randomly tilted platelets at $\pm \alpha_\Gamma$.

The theoretical findings can be verified using phase-field simulations. The phase-field method for fracture couples the displacement field to a smeared fracture field. The fracture field varies smoothly between $\phi = 1$ in pristine material to $\phi = 0$ at the cracks. For a domain $\subset \mathbb{R}^n$, first introduce the free energy $\mathcal{F}$ as the sum of the bulk stored energy $\mathcal{B}$ and the surface energy $\mathcal{S}$ required for creation of new cracks $\Gamma \subset \Omega$:

$$\mathcal{F}(u,\phi) := \mathcal{B}(u,\phi) + \mathcal{S}(\phi) \quad (4)$$

The bulk elastic energy can be written as $$\mathcal{B}(u, \Gamma) := \frac{1}{2} \int_\Omega g(\phi) C_{ijkl} \epsilon_{ij} \epsilon_{kl} dV \quad (5)$$

where $\epsilon_{ij} = (u_{i,j} + u_{j,i})/2$ is the linearized strain tensor and $C_{ijkl} = \lambda \delta_{ij} \delta_{kl} + \mu(\delta_{ik}\delta_{jl} + \delta_{il}\delta_{jk})$ is the elastic constitutive tensor and $\lambda = Ev/(1-v^2)$ and $\mu = E/(2(1+v))$ are Lame parameters for elastic modulus E and Poisson ratio v for plane-stresses.

Furthermore, the fracture energy can be written as $$\mathcal{S}(\varphi) := \frac{\Gamma_{0\mathcal{A}}}{4C_w \xi} \int_\Omega \left( w(\varphi) + \xi^2 D_{ij}(\mathcal{A}, \alpha_\Gamma) \phi_{,i} \phi_{,j} \right) dV \quad (6)$$

where $\xi$ is the process zone size, and $$C_w = \int_0^1 \sqrt{w(\phi)} d\phi$$

is a scaling constant. To recover the Herringbone fracture energy, the anisotropy tensor D is set as $$D_{ij}(\mathcal{A}, \alpha_\Gamma, y) = Q_{ik}\left(\alpha_\Gamma \tanh\left(-\frac{4y}{\xi}\right)\right) Q_{jl}\left(\alpha_\Gamma \tanh\left(-\frac{4y}{\xi}\right)\right) \begin{bmatrix} 1 & 0 \\ 0 & \mathcal{A}^{-2} \end{bmatrix} \quad (7)$$

where $$Q_{ij}(\alpha) = \begin{bmatrix} \cos \alpha & \sin \alpha \\ -\sin \alpha & \cos \alpha \end{bmatrix} \quad (8)$$

is the rotation matrix. In this simulation, the KKL model is used, i.e., $g(\varphi) = 3\phi^4 - 4\phi^3$, $w(\varphi) = 1 - g(\phi)$. (Murakami, Y., Material defects as the basis of fatigue design. *International Journal of Fatigue* 2012, 41, 2-10.)

Finally, the fracture propagation is posed as a variational problem where at each time step the displacement field u and the phase-field $\varphi$ are sought, such that they minimize the approximate free energy:

$$u^*_t, \phi^*_t = \mathrm{argmin} \, \mathcal{F}(u,\varphi) \forall u \in A_t, \phi_t \geq \phi_{t-1} \quad (9)$$

where $A_t$ is the admissible set of displacement satisfying the Dirichlet boundary conditions $u = \hat{u}_t$ on $\partial_D \Omega$. The Euler-Lagrange equations derived variationally from Eq. (9) are discretized using the Galerkin finite element method and solved using distributed data structures provided by libMesh and linear algebra solvers in PETSc. (Balay, S.; Abhyankar, S.; Adams, M. F.; Brown, J.; Brune, P.; Buschelman, K.; Dalcin, L.; Dener, A.; Eijkhout, V.; Gropp, W. D.; Karpeyev, D.; Kaushik, D.; Knepley, M. G.; May, D. A.; McInnes, L.

C.; Mills, R. T.; Munson, T.; Rupp, K.; Sanan, P.; Smith, B. F.; Zampini, S.; Zhang, H.; Zhang, H. *PETSc users manual. Technical Report ANL*-95/11; 2019.)

Figure 6C:
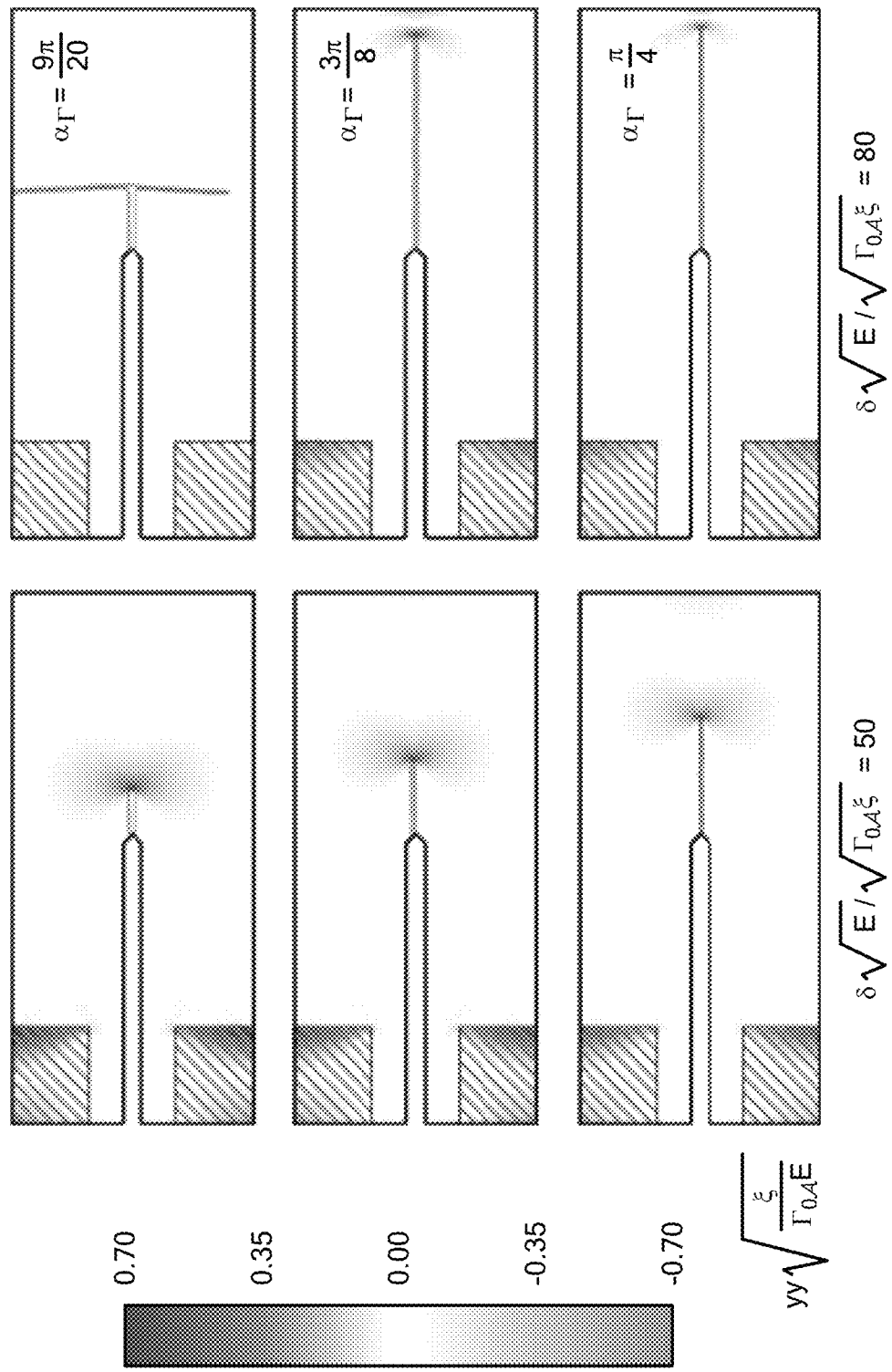
FIG. 6C illustrates fracture path ($\varphi=\frac{1}{2}$) in $\alpha_\Gamma=\pi/4$, $3\pi/8$, $9\pi/20$ Herringbone architecture for $\mathcal{A}=4$ corresponding to experimental samples.

The phase-field simulations were performed in a sample geometry shown in FIG. 6C, where $u_{x=0}$ and monotonically increasing vertical displacement $u_y=\pm\delta$ were imposed on top and bottom grips (hatched areas in FIG. 6C). FIG. 6 shows the fracture path at load $\delta\sqrt{E}/\sqrt{\Gamma_{0,\mathcal{A}}}\xi=50$, 80 and $\mathcal{A}=4$ (corresponding to the experimental samples) propagating in the herringbone structure. As predicted by the LEFM results (FIG. 6A) for $\alpha_{\Gamma=\pi/4,\ 3\pi/8}$ the crack is trapped at the mirror-symmetry line and is forced to propagate against a tough direction, whereas for $\alpha_{\Gamma=9\pi/20}$ the crack initially propagates at the symmetry line but later kinks due to the T-stress effect. (Mesgarnejad, A.; Pan, C.; Erb, R. M.; Shefelbine, S. J.; Karma, A., Crack path selection in orientationally ordered composites. *arXiv preprint* 2018, *arXiv:* 1811.05891) This is because as the straight crack propagates the T-stress increases and eventually deflects the crack.

Figure 6D:
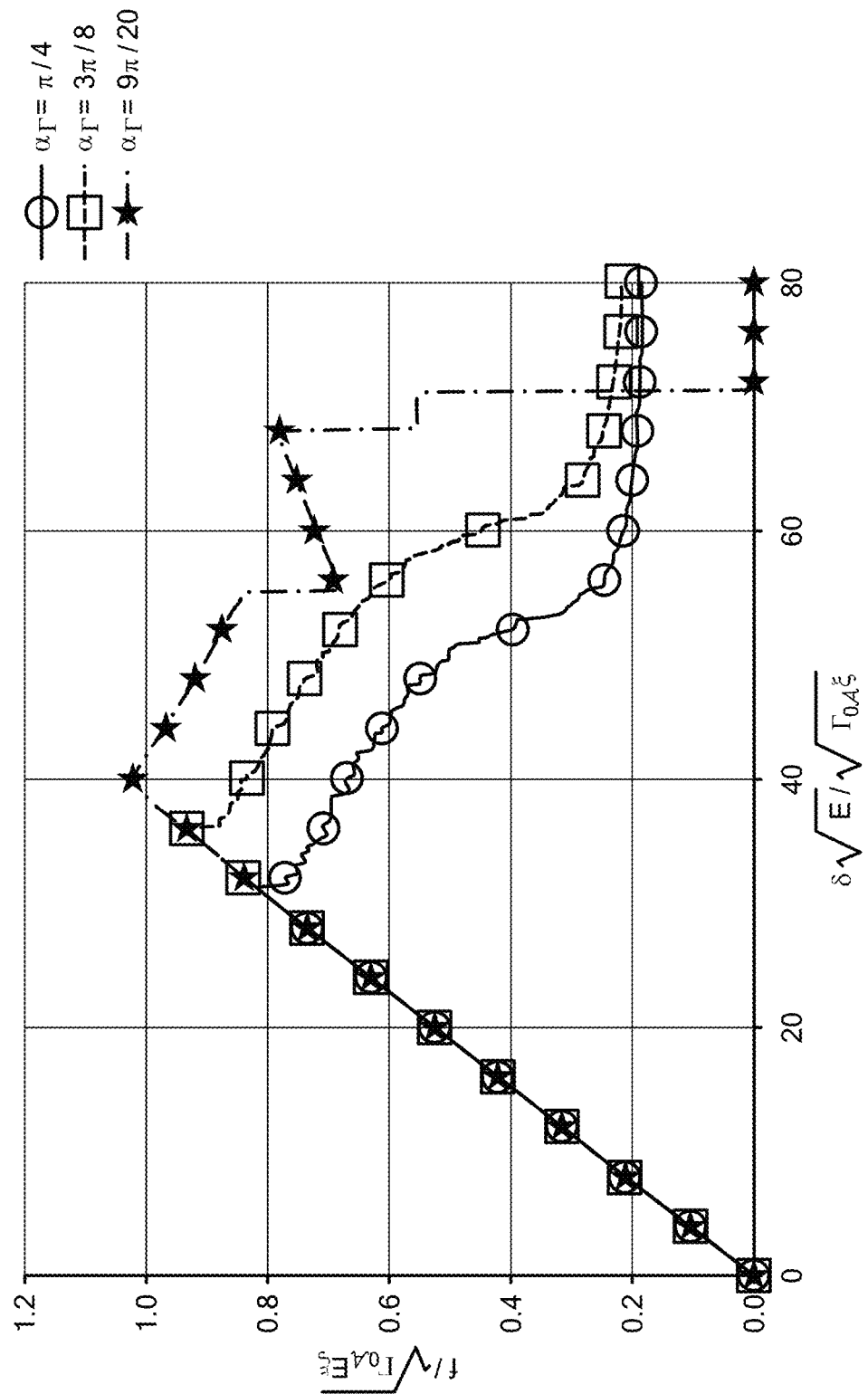
FIG. 6D illustrates load-displacement curves calculated from the phase-field simulations for herringbone structures with $\alpha_\Gamma=\pi/4$, $3\pi/8$, $9\pi/20$ and $\mathcal{A}=4$ (see also FIGS. 2A-2C, 6C). The markers are visual aids and do not reflect the actual number of time steps.

FIG. 6D shows the calculated load-displacement curves for different architectures using the phase-field simulations. It can be seen that the optimal herringbone architecture offers an enhanced crack propagation resistance where the crack is forced to propagate against a tough direction. It can also be seen that although for both $\alpha_\Gamma=9\pi/20$ to $\alpha_\Gamma=\pi/4$ and $\mathcal{A}=4$ the crack is trapped at the symmetry line, $\alpha_\Gamma=9\pi/20$ offers the best initial resistance to fracture. This verifies the closed-form LEFM analysis where it can be seen that $\alpha_\Gamma=9\pi/20$ is closer to optimal tilt angle line (dashed line in FIG. 6B). However, at $\alpha_\Gamma=9\pi/20$ the crack kinks later due to T-stress effects neglected in the LEFM analysis. The instability due to the T-stress effect is also reflected in the experimental observations (see FIGS. 7A-7E).

Figure 9:
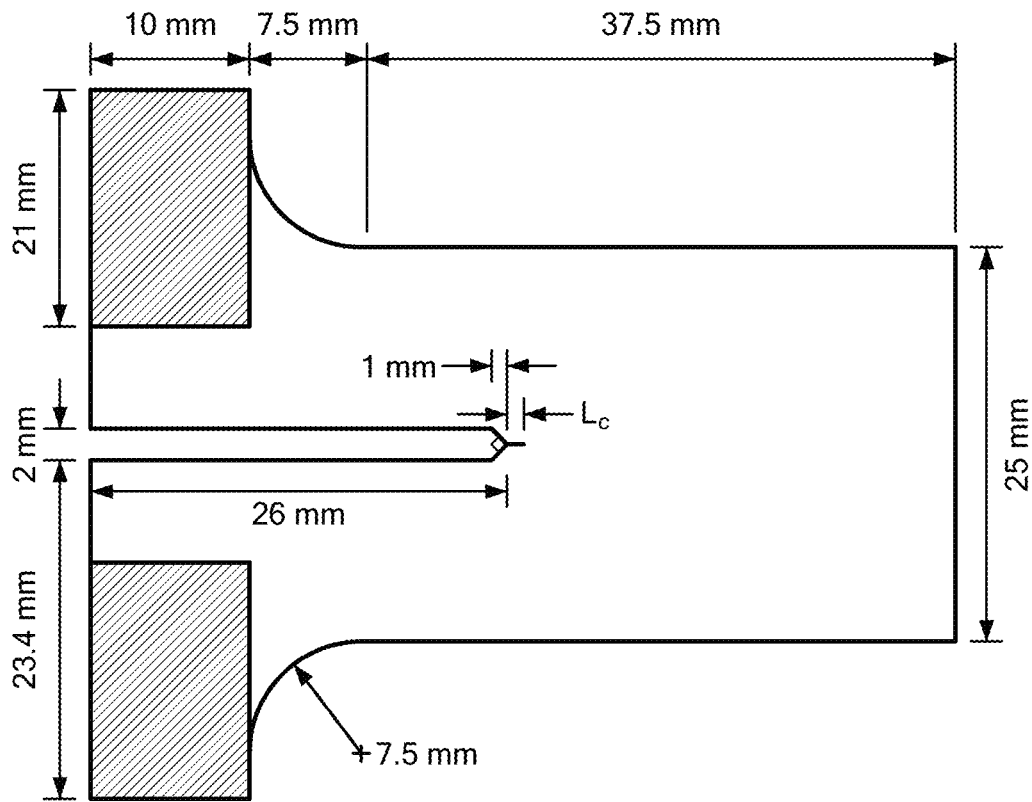
FIG. 9 is a schematic drawing of the experimental sample. Hatched areas show the placement of the upper and lower grips. The initial pre-notch length is shown in red.

Finally, the importance of the optimal tilt angle can be highlighted by comparing the load-displacement curves for the herringbone architecture for different fracture energy anisotropies. As shown in FIG. 9, assuming optimal toughening, it can be seen that using a more optimal platelet architecture ($\alpha_\Gamma=3\pi/8$), the less tough $\mathcal{A}=4$ can perform as well as the tougher composite in at a less optimal architecture ($\alpha_\Gamma=\pi/4$).

EXAMPLES

To investigate the anticipated mechanical enhancement of herringbone architectures, a series of samples were 3D magnetic printed with acrylate-based photo-polymers reinforced by 5 vol % alumina micro-platelets (corresponding to a fracture energy anisotropy of $\mathcal{A}=4$). Specifically, herringbone architectures were printed with two alignment zones below and above the spine with respective orientation angles of $\alpha_\Gamma=\pm 0$, $\alpha_\Gamma=\pm\pi/4$, $\alpha_\Gamma=\pm\pi/3$, $\alpha_\Gamma=\pm 7\pi/18$, and $\alpha_\Gamma=\pm\pi/2$, as shown in FIG. 7A (actual samples) and FIG. 7B (schematics). The samples included different categories of architectures including the following: monolithically aligned samples with a filler alignment perpendicular to the direction of the applied tensile force ($\alpha_\Gamma=\pm 0$, first column) or parallel to the direction of applied tensile force ($\alpha_\Gamma=\pm\pi/2$, fifth column) and "herringbone" aligned samples with the two zones at different angles including $\alpha_\Gamma=\pm\pi/4$ (second column), $\alpha_\Gamma=\pm\pi/3$ (third column), and $\alpha_\Gamma=\pm 7\pi/18$ (fourth column), with the coordinate system $\theta$ defined in FIG. 1A. The specific sample geometry had been determined previously to effectively capture Mode I fracture behavior. (Mesgarnejad, A., et al., 2018) However, previous geometries needed to be further augmented with a wider curving geometry near the tension gripping points to prevent stress concentrations—a new requirement due to the surprising mechanical enhancement provided by the tested herringbone architectures. All samples were pre-notched and heat treated to ensure a stress-free, nanoscale notch as described in the experimental methods.

Figure 7C:
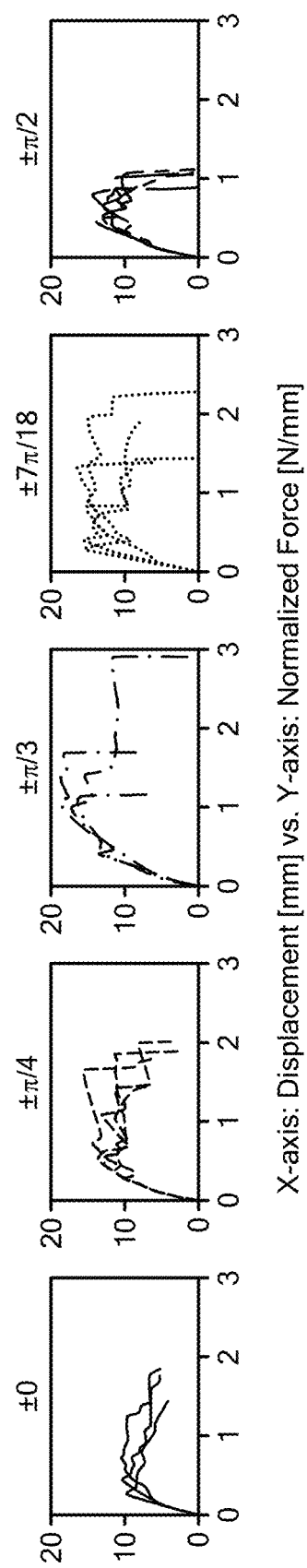
FIG. 7C illustrates a series of graphs of force normalized by sample thickness in [N/mm] versus extension curves, presented for each grouping of herringbone patterns.
Figure 7D:
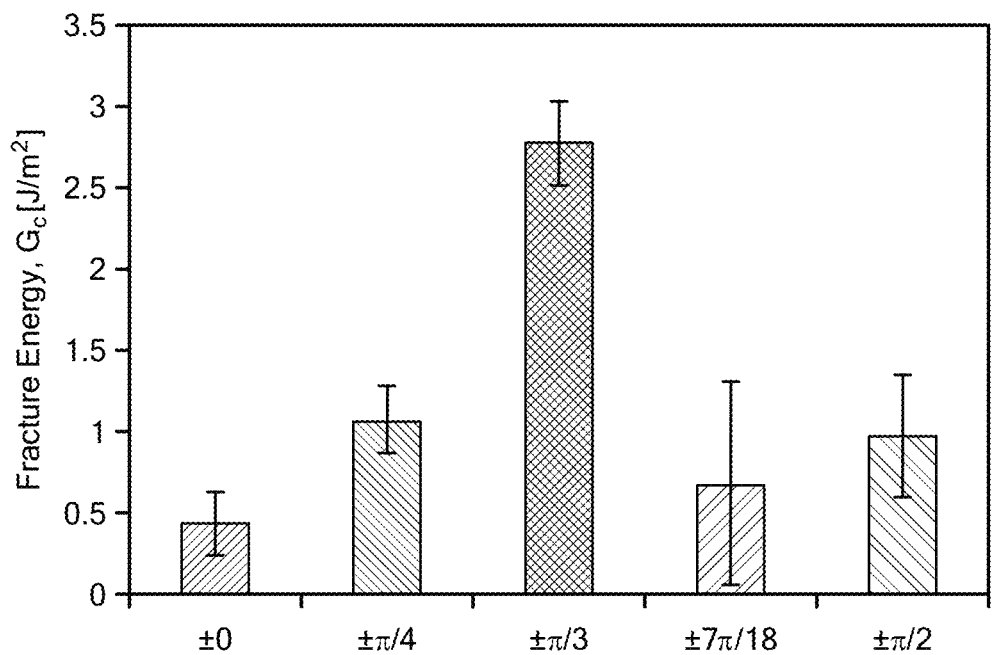
FIG. 7D is a graph of the fracture energy, G, as calculated from comparison to numerical simulations, demonstrating peak fracture toughness around $\alpha_\Gamma=\pm\pi/3$.
Figure 7E:
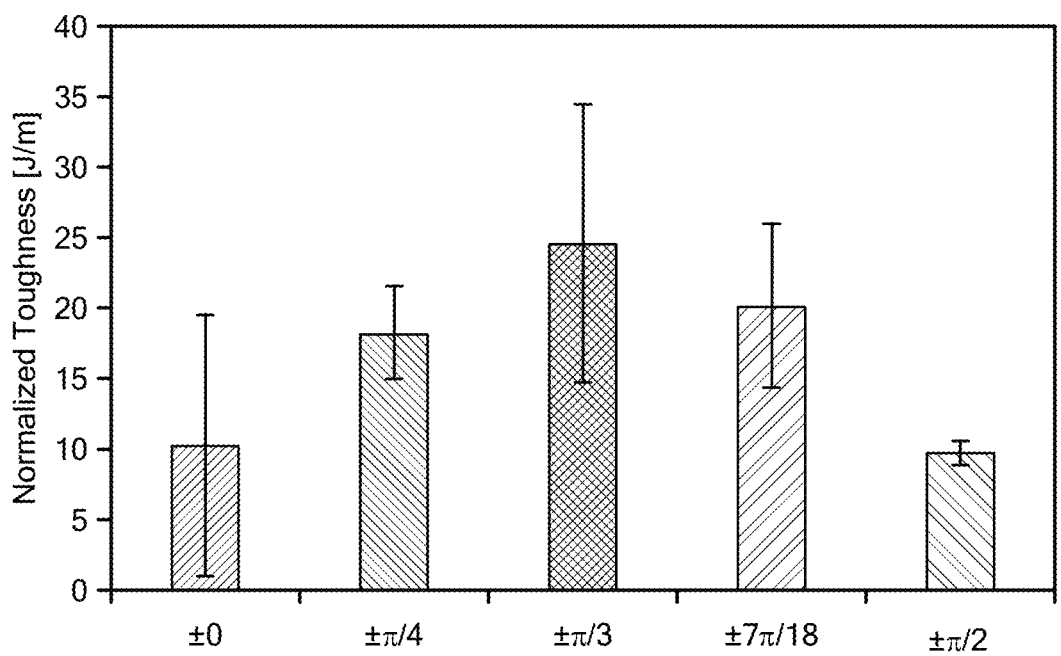
FIG. 7E is a graph of normalized toughness. For comparison, total areas under the curve of fractured samples are presented corroborating a peak toughness around $\alpha_\Gamma=\pm\pi/3$.

Samples were tested under tension in an Instron Universal tester with the tension grips clamping the samples behind the notch (hatched region in FIG. 6C and FIG. 7B). Mode I tension tests are presented in a normalized force in which the applied force is divided by the sample thickness as shown in FIG. 7C. Numerical simulations were used to determine the samples' initial strain energy release rate G as a function of the pre-notch crack length. Assuming cracks emerge straight and the Griffith criterion $G=G_c$, this allowed to measure the fracture energy for 1 mm initial pre-notch. (Details of the Griffith criterion are provided below.)

For the two monolithic sample groupings tested, the $\alpha_\Gamma=\pm\pi/2$ samples exhibited a 43% increase in stiffness and a 127% increase in $G_C$ compared to the $\alpha_\Gamma=\pm 0$ samples. This monolith comparison is consistent with both the theoretical predictions as well as conventional guidelines for "optimal" composite design in which reinforcement is supposed to be oriented orthogonal to the notch. In contrast, herringbone architectures show a surprising increase in $G_C$ over both monolithic orientations. In the case of the $\alpha_\Gamma=\pi/3$ herringbone architecture, the samples demonstrated an improvement to $G_C$ with average increases of 185% and 549% in $G_C$ compared to the monolithic samples of $\theta=\pi/2$ and $\theta=0$, respectively, shown in FIG. 7D. These gains are corroborated by comparing the energy on the curve in the force normalized by thickness versus displacement plot, shown in FIG. 7E. Observing such gains in $G_C$ for such a simple redesign of the reinforcement architecture is surprising. Cracks in these specimens showed an array of behavior between propagating forward and kinking. Based on previous measurements (Mesgarnejad, A.; et al., 2018), the facture energy anisotropy $\mathcal{A}\simeq 4$ can be predicted for the experimental samples. For $\mathcal{A}\simeq 4$, the LEFM analysis predicts an optimal tilt angle for the herringbone architecture $\alpha_\Gamma\simeq 0.47\pi$ compared to $\alpha_\Gamma\simeq 0.33\pi$ observed experimentally. This suggests that the precise form of the fracture energy anisotropy is the main source of this discrepancy between the theoretical LEFM predictions and the experimental results. A simple two-fold fracture energy anisotropy function was used in the LEFM analysis and phase-field simulations. While this simple form may be different from the true fracture energy anisotropy of these composites, the theoretical framework, including the existence of an optimal herringbone architecture remains valid as experimentally demonstrated.

Other herringbone architectures showed similar trends. Subtle gains were found in the $\alpha_\Gamma=\pm\pi/4$ herringbone architecture in which samples demonstrated an average increase of 9% and 148% in $G_C$ compared to the monolithic samples of $\alpha_\Gamma=\pm\pi/2$ and $\alpha_\Gamma=\pm 0$, respectively. All cracks were found to propagate straight along the symmetry line (cleavage plane) of the herringbone architecture. As the cracks were pinned in this direction, the samples exhibited large areas under the normalized force versus displacement curves. Experimental samples with $\alpha_\Gamma=\pm 7\pi/18$ herringbone architectures (that sit close to the optimal tilt angle value predicted by the theoretical LEFM analysis) demonstrated crack kinking. As previously highlighted by the phase-field simulations, architectures close to the optimal theoretical tilt angle are more sensitive to T-stress instability and kinking. While in the numerical simulations kinking only occurred after propagation, heterogeneities in the experimental sample can result in expedited kinking as experimentally observed. Heterogeneities can include local inconsistencies in the alignment or concentrations of the ceramic particles along the symmetry line of the herringbone pattern. In the experiments, these $\alpha_\Gamma=\pm 7\pi/18$ samples on average showed a much noisier and reduced fracture energy $G_C$ compared to the other herringbone architectures highlighting the reduced stability of the crack path. This noise may have caused most samples in this group to behave like the monolithic sample of $\alpha_\Gamma=\pm 7\pi/2$. Nevertheless, the $\alpha_\Gamma=\pm 7\pi/18$ herringbone architectures still demonstrate enhanced total toughness, taken as the area under the curve relative to their monolithic counterparts.

As demonstrated through these experiments and predicted by the theoretical LEFM results, the herringbone architectures demonstrate the ability to significantly improve the toughness of the printed specimens. $G_C$ and the areas under the normalized force versus displacement are both strong functions of the center-line alignment angles of the herringbone architecture with experimental values peaking around $\alpha_\Gamma=\pm \pi/4$. Further reduction of experimental heterogeneities should result in pushing the optimal herringbone alignment closer to the numerical predictions, effectively increasing further the $G_C$ of herringbone composites.

Figure 2C:
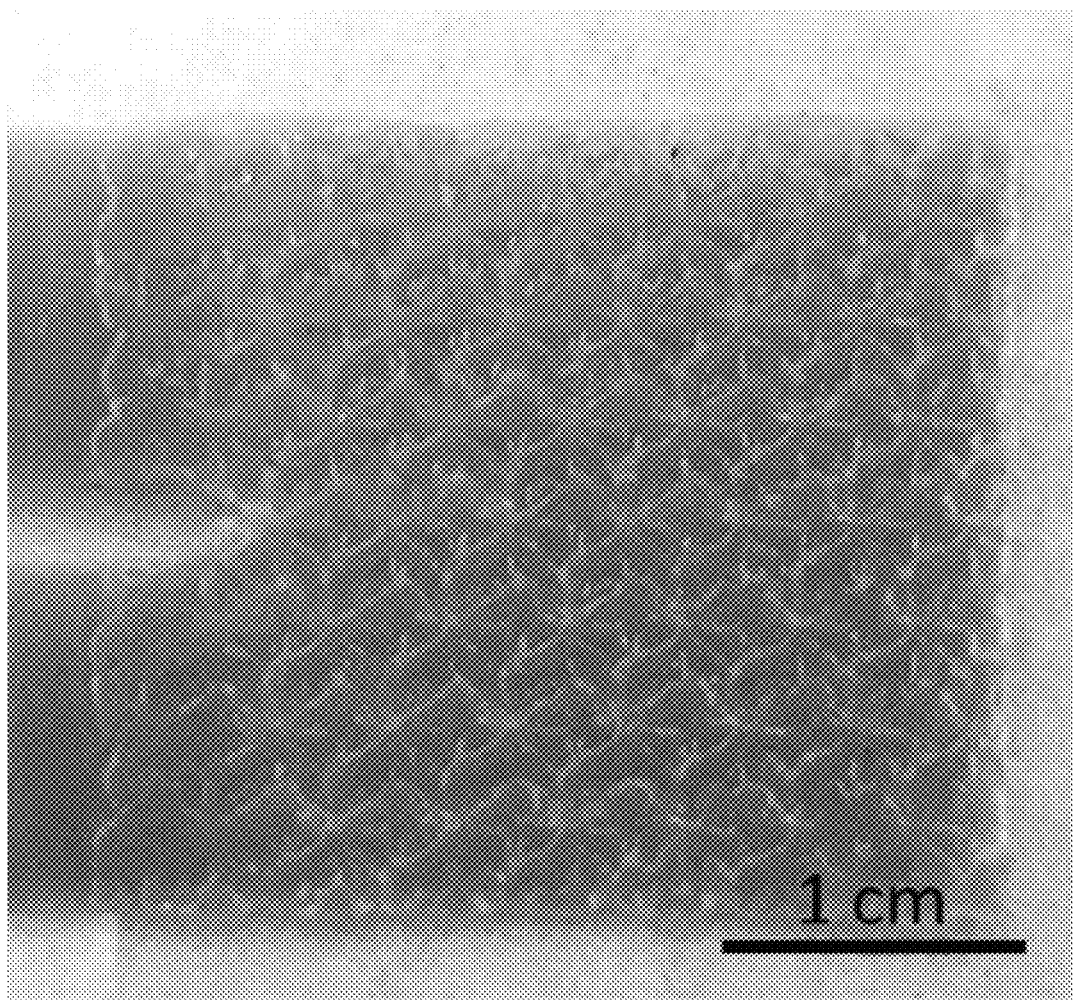
FIG. 2C illustrates an actual mosaic pattern as in FIG. 2A that exhibits interesting optical properties with the oriented alumina interacting with incident light.
Figure 8A:
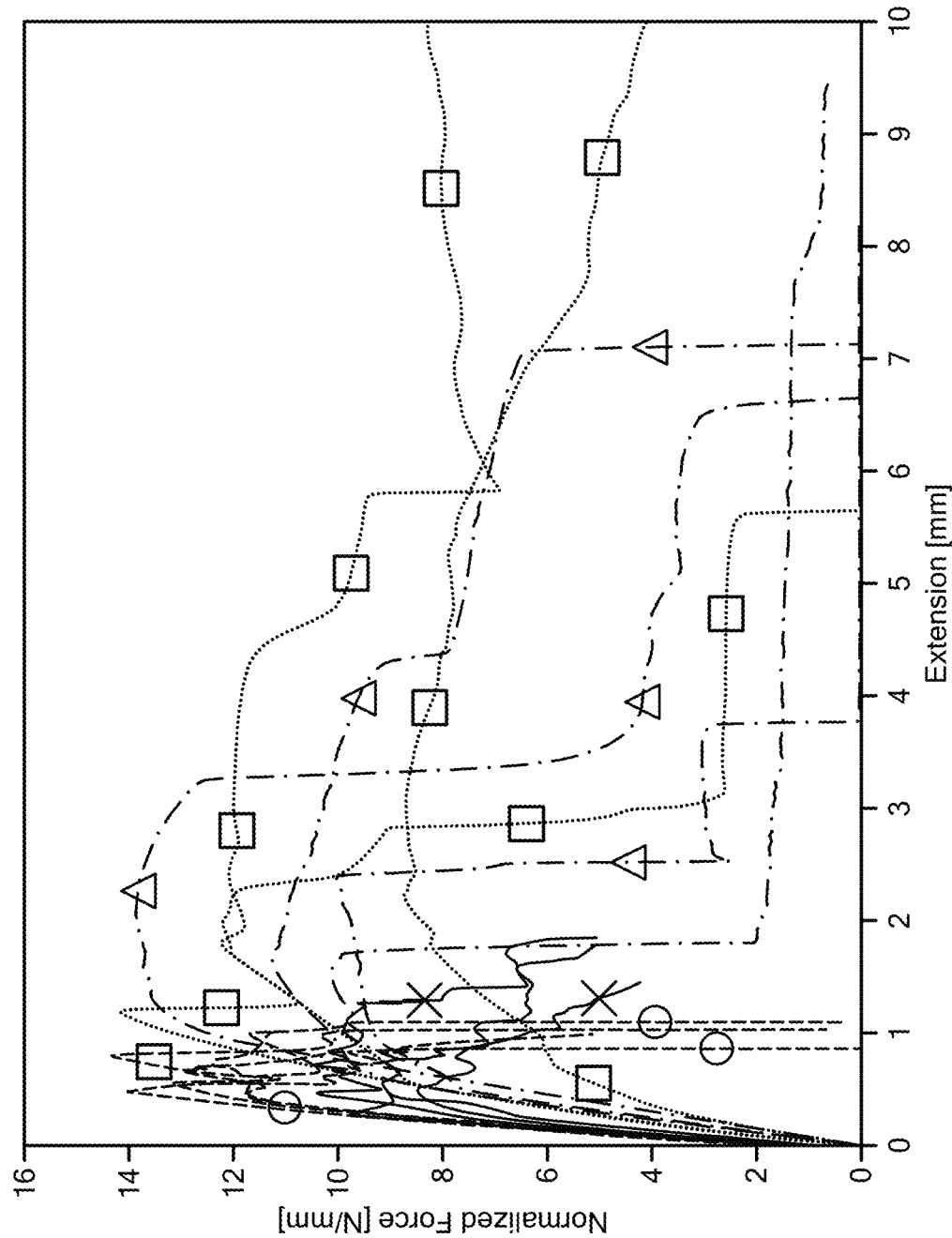
FIG. 8A is a graph of the force normalized by thickness of samples versus extension for the herringbone mosaics globally oriented at 0 (solid line, with triangles) and $\pi/2$ (dotted line, with boxes). Monolithic samples including 0 (with X's) and $\pi/2$ (with circles) are provided for comparison. Current convention suggests that monolithic $\pi/2$ provides optimal fracture energy.
Figure 8B:
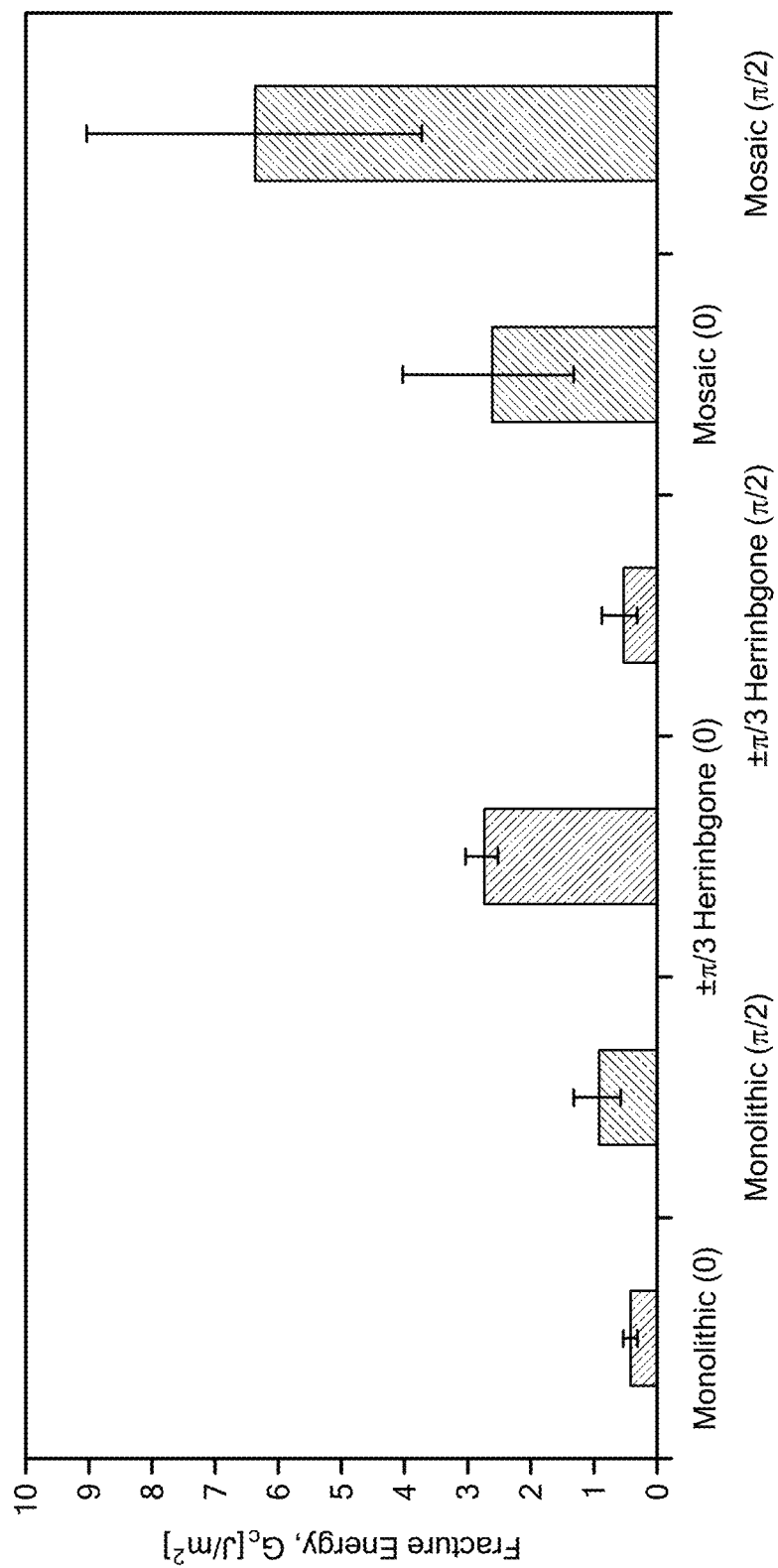
FIG. 8B illustrates that the herringbone mosaic demonstrates remarkable fracture energy when tested in both directions, suggesting a robustly isotropic response.

Leveraging the remarkable increases to fracture toughness in herringbones, these principles can be applied to make composites that exhibit more isotropic enhanced fracture toughness. In the simple herringbone patterns of FIGS. 7A-7E there still exists an anisotropy in $G_C$ depending on the orientation of the pre-notch and loading relative to the herringbone pattern. To push herringbone patterns even further, creating mosaics of herringbone patterns throughout the materials was investigated. Such a demonstrative mosaic is shown in FIG. 2A. These patterns result in interesting optical patterns within the samples with the magnetized alumina interacting differently with incident light depending on the particle orientation (FIG. 2C). In the exploratory pattern, herringbone structures were patterned every $\pi/3$ around a hexagonal unit cell used to create the mosaic. These herringbone mosaics were employed to pattern Mode I sample specimens in the same geometries tested for simple herringbone structures. The associated crack propagation paths of fractured samples are provided in FIGS. 8A and 8B for patterns globally oriented at $\theta=0$ and $\theta=\pi/2$, respectively. Both orientations of the mosaic demonstrate good fracture toughness as shown in FIG. 8B with samples reaching $G_C$ values comparable to the best simple herringbone architectures. Meanwhile, the simple herringbone pattern exhibits a significantly decreased $G_C$ when the pattern is rotated by $\pi/2$ relative to the loading and notched geometry. These high values for $G_C$ in herringbone mosaics were further corroborated by measuring the area under the normalized force versus displacement curves. Therefore, creating mosaics of the herringbone structure offers a useful approach for making the enhanced fracture toughness of the herringbone more isotropic in plane. The technology can be extended from such two-dimensional mosaic patterns into the third dimension to create truly isotropic herringbone patterned materials with exceptional toughness in all directions.

Experimental Methods

Preparation of magnetized alumina micro-platelets: The creation of precise alignment architectures made from aluminum oxide required a high degree of precision in particle alignment. A variety of techniques to achieve this effect exist, but a great degree of precision and customizability can be produced through the application of external, alternating magnetic fields. In order to make these particles susceptible to these fields, it was necessary to coat them with a material with a high degree of magnetic response. Commercially available iron oxide nanoparticles provided this responsiveness (often referred to as "Ultra High Magnetic Response" particles), displaying an exceptional level of paramagnetic response to fields induced by external solenoid devices, allowing for the aluminum oxide to achieve a 3D alignment with fields alternating polarity at a sufficiently high frequency. To coat the aluminum oxide platelets with the iron oxide, a suspension of 10 grams of platelets was placed in a suspension of ~1000 mL of deionized water. This suspension was placed on a hot plate with a rotating magnetic field with a stir bar placed within, rotating at ~600-700 rpms to produce a mixing vortex within the suspension. This was followed by the addition of 375 micro-liters of iron oxide ferrofluid (nanoparticles suspended in water) to the mixing alumina. This solution was then allowed to mix for ~24 hours, allowing the iron oxide particles to adsorb to the surface of the aluminum oxide platelets. This is followed by a filtering process, in which the solid platelets were separated from the water suspension, and a ~12 hour exposure to 90° C. in a convection oven to evaporate any remaining water.

Preparation of photocurable resins: Samples were prepared using a 1:9 mass ratio of polyeurethane and isobornyl acrylate, mixed with a 2% mass percentage of Phenylbis (2,4,6-trimethylbenzoyl) phosphine oxide and 1-Hydroxycyclohexyl phenyl ketone photoinitiates. This mixture was hand mixed, followed by 2 minutes of tip sonication to break up any material aggregates, and 20 minutes of bath sonicated to disperse the initiate powders within the polyeurethane-IBOA system, finalizing the resin which forms the bulk matrix of the composite polymer. Once the pure polymer resin preparation was finished, a 5% volume fraction of the aluminum oxide platelets was added relative to the resin and again tip and bath sonicated for similar times to break up aluminum oxide aggregates and disperse them uniformly within the system.

3D magnetic printing and pre-notching of samples: Following the final mixture of the composite resin system, the material was inserted between two glass substrates. The substrates were suspended over a single, static Z-axis solenoid and between two X-Y axis alternating field solenoids, allowing for alignment for the super-paramagnetic aluminum oxide platelets while the bulk resin was still in a liquid phase. Following 15 seconds of magnetic alignment, a projector connected to an external laptop displayed an image projecting the desired section of the sample under production in ~405 nanometer wavelength UV light. This initiated material crosslinking in the area under UV exposure, transitioning the desired section of the sample into a solid with the desired filler alignment. This step was repeated for each of the sample sections for the remaining desired alignments, creating a single, continuous fracture coupon with several different areas of uniform alignment. This was followed by a cleaning of the surface with diluted isopropyl alcohol to remove non-polymerized or partially polymerized resin from the surface of the test sample. Following the final cleaning step, the sample was exposed to a higher-power projector for 30 minutes (15 minutes each side) in order to complete the system polymerization, reducing sample ductility. They were then placed in an oven at 90° C. for 2 hours in order to reduce stresses in the sample. 20 minutes into this exposure, the samples were temporarily removed to extend the pre-engineered notch by 1 mm in order to produce a consistent starting location for the sample fracture for all tensile tests. After the 2 hours elapsed, the samples were removed from the oven and allowed to drop below their glass transition temperature, returning to their original ductility and ready to be fractured.

Mode I fracture tests: Once sample preparation was completed, fracture testing was carried out using an Instron Tensile Tester. Sample ends were held in place using Instron clamps, with one clamp remaining stationary while the other moved upwards from its zeroed position at a pre-selected strain rate. In order to limit the effects of out-of-plane deformation which might cause fracture of differing modes besides that of Mode I, the samples were placed between a pair of glass slides, separated by a set of spacers to ensure the slides and samples were not in contact initially, and held in place by an external clamp. In addition, to ensure that contact between the samples and slides during testing would not affect the results due to frictional concerns, the interior of the slides was covered with soap-water to reduce the force due to the sample dragging across the glass surface.

Prior ex-situ studies have demonstrated the strain-rate dependence of polymeric systems behavior, with lower strain rate/higher temperature tensile conditions producing viscoelastic response and higher strain rate/lower temperature conditions producing more brittle system responses. As a result, samples were exposed to tensile force conditions at strain rates of 20 mm/min, which prior in-situ lab tests had shown to be sufficient to produce non-viscoelastic mechanical results. The test was continued until an initiated fracture propagated throughout the entire sample and was manually discontinued. Fracture results were then output as a set of force versus displacement data, which was later normalized using the average thickness of the sample under test. Additionally, tests were video recorded to aid in determining which portions of the force versus displacement curves were associated with different fracture behaviors during testing. This allowed to ensure the determination of exactly what point of the curve could be said to be associated with the fracture initiation and where this fracturing behavior could be said to end.

Determination of G: To calculate the critical energy release rate $G_c$, elastic finite element analysis was performed of the experimental specimen geometry (FIG. 9) and the energy release rate was calculated from the crack tip. The sample was loaded by imposing displacement $u_x \equiv 0$ and $u_y = \delta$ on the upper grip area and $u_x = u_y \equiv 0$ on the lower grip (shown in FIG. 9 hatched in gray).

Figure 10:
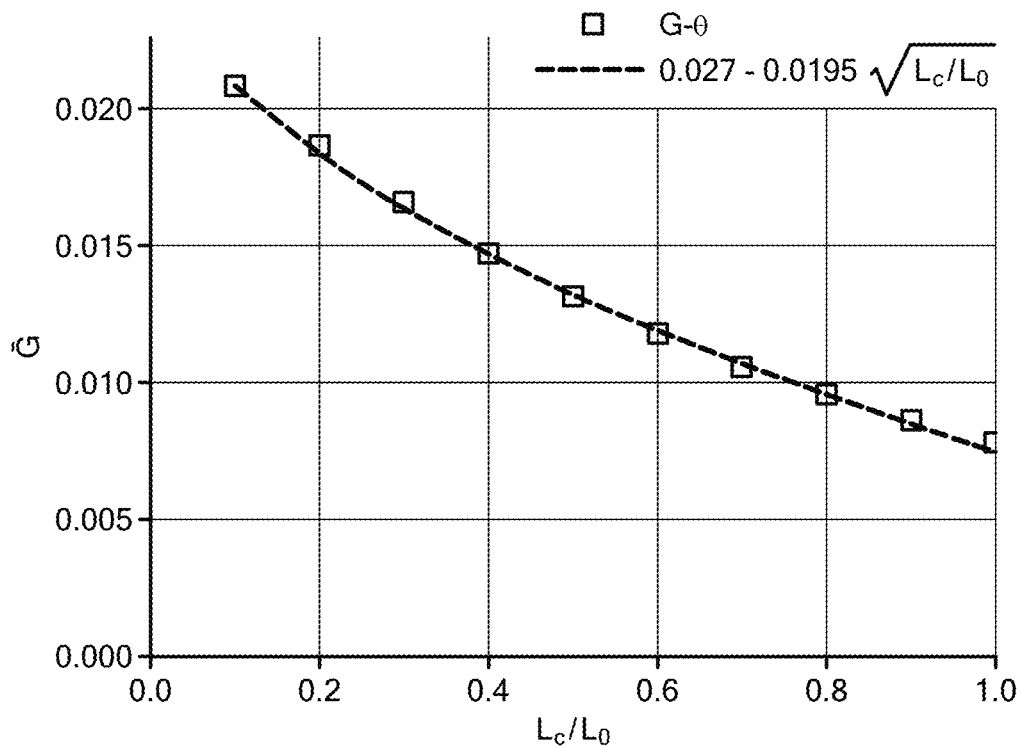
FIG. 10 illustrates numerically calculated dimensionless fracture energy $\overline{G}$ as a function of the dimensionless pre-notch length $L_c/L_0$.
Figure 11:
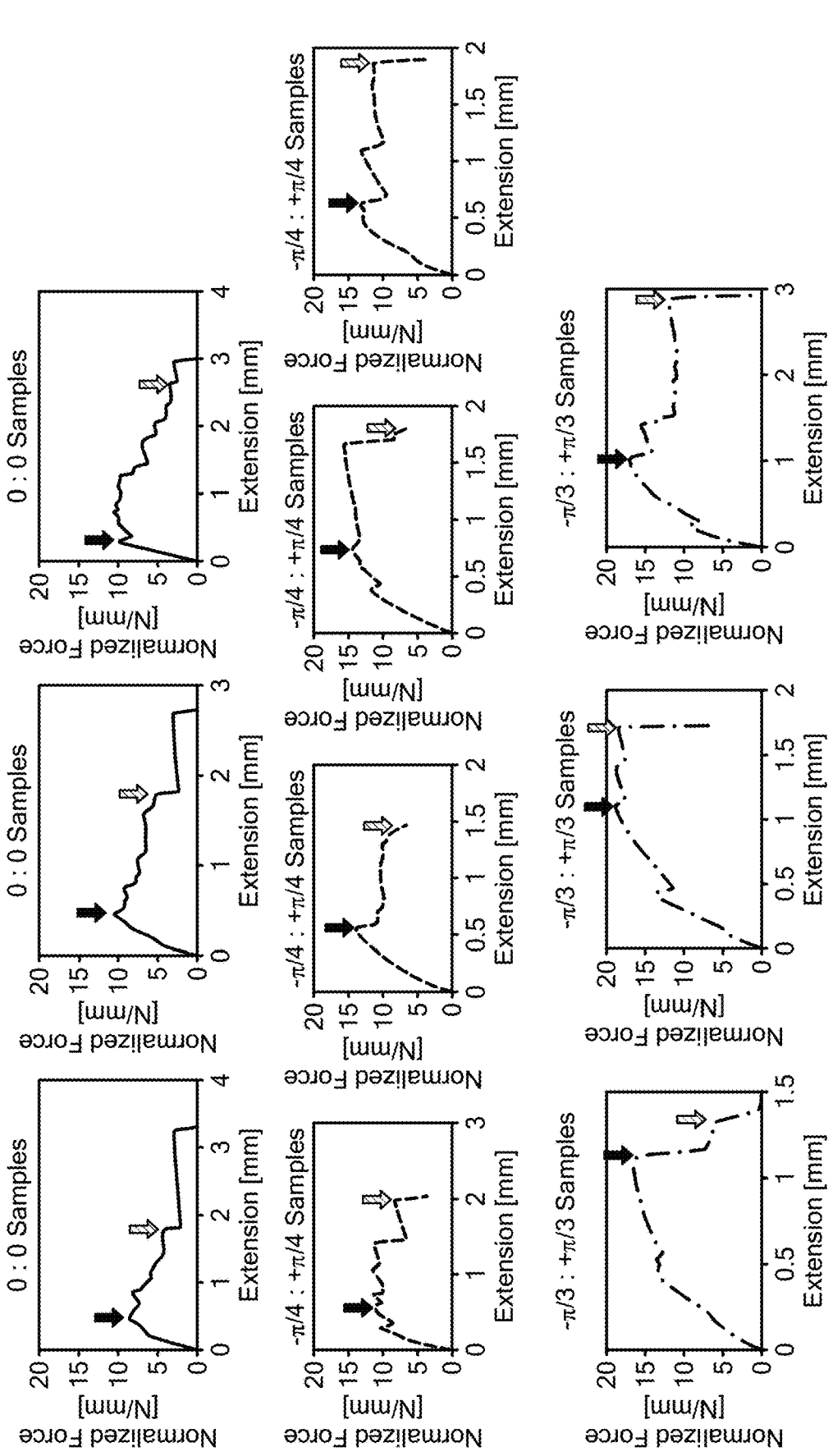
FIG. 11 illustrates graphs of normalized force vs. extension for various samples.
Figure 11:
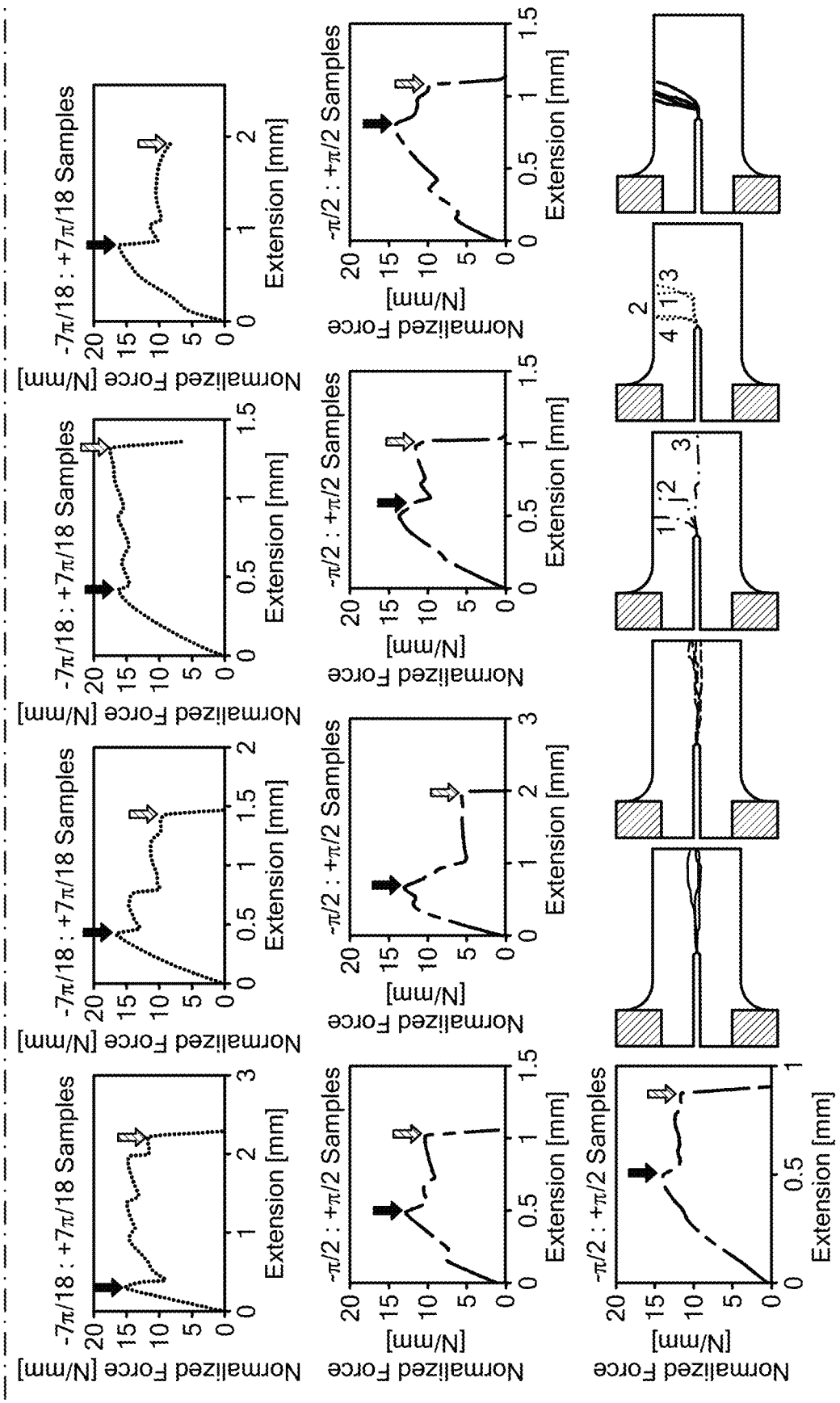
Figure 12:
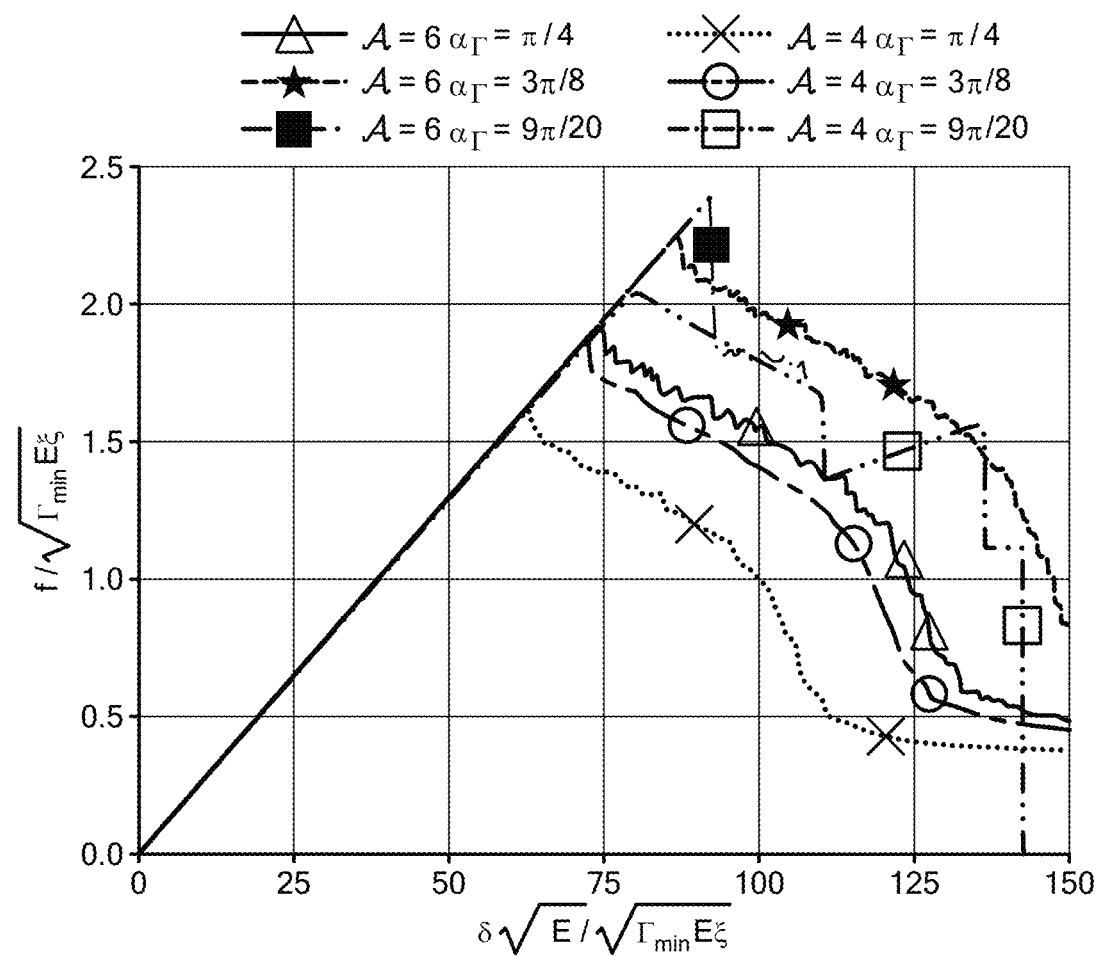
FIG. 12 illustrates a comparison of load-displacement curves calculated from the phase-field simulations for herringbone structures with $\alpha_\Gamma=\pi/4$, $3\pi/8$, $9\pi/20$ and $\mathcal{A}=4, 6$.

Simple dimensional analysis showed that the energy release rate from the tip of a crack assuming LEFM, for displacement controlled, can be written as:

$$G = C E L_0 \left(\frac{\delta}{L_0}\right)^2$$

where E is the elastic modulus of the material, $L_0$ is a characteristic dimension used to adimensionalize the sample for the computer simulation (here, take $L_0=10$ mm), $\delta$ is the applied displacement, and $\overline{G}$ is a geometry (crack length) and load configuration dependent dimensionless fracture energy. FIG. 10 shows the obtained values of $\overline{G}$ through elastic finite element simulation and using G-θ method for straight cracks of length $L_c$ extending from the V-shaped notch. Furthermore, it can be seen that for the experimental geometry (FIG. 9) and loading configuration, the constant $\overline{G}$ was well fitted by a closed-form polynomial $\overline{G} \simeq 0.027 - 0.0195\sqrt{L_c/L_0}$.

Furthermore, the elastic modulus of samples E=1.13 Gpa was obtained by fitting the numerical stiffness of the samples to the experimental stiffness obtained load-displacement curves. Combined with the polynomial fit to constant $\overline{G}$, a closed form formula was obtained to calculate energy release rate from the tip of a straight crack of length $L_c$ [mm] with the upper grip displacement δ [mm]:

$$G = (3.07 - 0.7\sqrt{L_c})\delta^2 \tag{10}$$

Determination of initial fracture energy: Assuming the Griffith criterion $G=G_c$ the fracture energy was calculated using Eq. 10 as the critical energy release rate for the critical load $\delta_c$ at onset of fracture propagation for the initial pre-notch $L_c \simeq 1$ mm.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies. It should be noted that all possible combinations of features that would be implied by rendering the claims multiply dependent are explicitly envisaged and should be considered part of the invention.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A composite material comprising:
   a volume of a matrix material and a plurality of particles disposed within the matrix material, the particles having a geometric shape with a longest dimension and a shortest dimension different from the longest dimension; and
   the volume has an anisotropic structure in at least two dimensions comprising:
      a plurality of volume portions arranged in a mosaic pattern with adjacent volume portions abutting along an interface comprising a surface forming a common boundary between the adjacent volume portions, and
      the particles within at least one pair of adjacent volume portions are disposed in orientations to form a herringbone pattern in a plane that is normal to the interface, in which the interface corresponds to a spine of the herringbone pattern, wherein the geometric shape with the longest dimension of the particles of a first volume portion of the at least one pair of adjacent volume portions is disposed at a first non-orthogonal angle with respect to the interface, the geometric shape with the longest dimension of the particles of a second volume portion of the at least one pair of adjacent volume portions is disposed at a second non-orthogonal angle with respect to the interface and mirroring the first non-orthogonal angle, and wherein the orientations of the particles in the at least one pair of adjacent volume portions selected so that a crack propagating on a crack propagation path through the first volume portion or the second volume portion of the at least one pair of adjacent volume portions stops at or deflects to propagate along the interface.

2. The composite material of claim 1, wherein at least a subset of the plurality of the volume portions are arranged in the mosaic pattern to be adjacent to at least three other volume portions.

3. The composite material of claim 1, wherein the non-orthogonal angles between the particles within the adjacent volume portions and the interface between the adjacent volume portions are determined using a function of fracture energy anisotropy for the composite material.

4. The composite material of claim 1, wherein the non-orthogonal angle of each of the volume portions is based in part on determining an angle where fracture energy anisotropy of the composite material is equal to or greater than 3.

5. The composite material of claim 1, wherein the non-orthogonal angle ranges from 30°±1° to 75°±1° with respect to the interface.

6. The composite material of claim 1, wherein the volume comprises a layer having opposed surfaces and a thickness between the opposed surfaces, and the volume portions are arranged in a polygonal pattern within the layer.

7. The composite material of claim 6 wherein the polygonal pattern is a hexagonal pattern, and the orientation of the particles in the adjacent volume portions of the hexagonal pattern differ by 30°±1° or by 60°±1°.

8. The composite material of claim 1, wherein the volume further comprises a plurality of layers, each layer having opposed surfaces and a thickness between the opposed surfaces, the layers arranged in a stack in a thickness direction, and the volume portions are arranged in a polygonal pattern within each layer.

9. The composite material of claim 1, wherein the anisotropic structure comprises a rotating herringbone structure, rows of stacked herringbone structures, or a Bouligand structure.

10. The composite material of claim 1, wherein the geometric shape of the particles is a platelet, flake, filing, fiber, rod, or whisker.

11. The composite material of claim 1, wherein the particles have a longest dimension ranging from 200 nm to 1000 μm.

12. The composite material of claim 1, wherein the particles have an aspect ratio of the longest dimension to the shortest dimension of at least 2.

13. The composite material of claim 1, wherein the particles are magnetically responsive particles comprising at least in part a magnetic material.

14. A product comprising the composite material of claim 1.

* * * * *